US011006235B2

(12) United States Patent
Lee et al.

(10) Patent No.: US 11,006,235 B2
(45) Date of Patent: *May 11, 2021

(54) METHOD FOR GENERATING CUSTOMIZED SPATIAL AUDIO WITH HEAD TRACKING

(71) Applicant: Creative Technology Ltd, Singapore (SG)

(72) Inventors: Teck Chee Lee, Singapore (SG); Geith Mark Benjamin Leslie, London (GB); Mark Anthony Davies, Middlesex (GB); Edwin Tomboza, London (GB); Toh Onn Desmond Hii, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,746

(22) Filed: Aug. 19, 2019

(65) Prior Publication Data

US 2019/0379995 A1    Dec. 12, 2019

Related U.S. Application Data

(63) Continuation of application No. 16/136,211, filed on Sep. 19, 2018, now Pat. No. 10,390,171.
(Continued)

(51) Int. Cl.
*H04S 7/00* (2006.01)
*G06F 3/01* (2006.01)
(Continued)

(52) U.S. Cl.
CPC .............. *H04S 7/304* (2013.01); *G06F 3/012* (2013.01); *G06K 9/6204* (2013.01);
(Continued)

(58) Field of Classification Search
CPC .. H04R 5/033; H04R 5/04; H04R 3/00; H04S 2420/01; H04S 2400/11; H04S 7/304;
(Continued)

(56) References Cited

U.S. PATENT DOCUMENTS 7,555,354 B2   6/2009   Walsh et al.
7,840,019 B2   11/2010  Slaney et al.
(Continued)

FOREIGN PATENT DOCUMENTS

FR         3051951 B1       6/2018
WO     2017041922 A1       3/2017
(Continued)

OTHER PUBLICATIONS

John C. Middlebrooks, "Virtual localization improved by scaling nonindividualized external-ear transfer functions in frequency," Journal of the Acoustical Society of America, Sep. 1999, pp. 1493-1510, vol. 106, No. 3, Pt. 1, USA.
(Continued)

*Primary Examiner* — Paul Kim
(74) *Attorney, Agent, or Firm* — Russell Swerdon; Desmund Gean

(57) ABSTRACT

A headphone for spatial audio rendering includes a first database having an impulse response pair corresponding to a reference speaker location. A head sensor provides head orientation information to a second database having rotation filters, the filters corresponding to different azimuth and elevation positions relative to the reference speaker location. A digital signal processor combines the rotation filters with the impulse response pair to generate an output binaural audio signal to transducers of the headphone. Efficiencies in creating impulse response or HRTF databases are achieved by sampling the impulse response less frequently than in conventional methods. This sampling at coarser intervals
(Continued)

reduces the number of data measurements required to generate a spherical grid and reduces the time involved in capturing the impulse responses. Impulse responses for data points falling between the sampled data points are generated by interpolating in the frequency domain.

20 Claims, 11 Drawing Sheets

Related U.S. Application Data

(60) Provisional application No. 62/614,482, filed on Jan. 7, 2018.

(51) Int. Cl.
| | | |
|---|---|---|
| *G06K 9/62* | (2006.01) | |
| *G10L 21/0208* | (2013.01) | |
| *H04R 3/00* | (2006.01) | |
| *H04R 5/033* | (2006.01) | |
| *H04R 5/04* | (2006.01) | |

(52) U.S. Cl.
CPC .......... *G10L 21/0208* (2013.01); *H04R 3/00* (2013.01); *H04R 5/033* (2013.01); *H04R 5/04* (2013.01); *H04S 7/30* (2013.01); *H04S 2400/11* (2013.01); *H04S 2420/01* (2013.01)

(58) Field of Classification Search
CPC ....... H04S 7/30; G10L 21/0208; G06F 3/012; G06K 9/6204
USPC ......................................................... 381/309
See application file for complete search history.

(56) References Cited

U.S. PATENT DOCUMENTS

| | | | | |
|---|---|---|---|---|
| 7,936,887 | B2* | 5/2011 | Smyth .................... | H04S 7/304 381/309 |
| 9,030,545 | B2 | 5/2015 | Pedersen | |
| 9,544,706 | B1 | 1/2017 | Hirst | |
| 9,584,946 | B1 | 2/2017 | Lyren et al. | |
| 9,602,947 | B2 | 3/2017 | Oh et al. | |
| 10,225,682 | B1 | 3/2019 | Lee et al. | |
| 2008/0170703 | A1 | 7/2008 | Zivney | |
| 2012/0008806 | A1 | 1/2012 | Hess | |
| 2012/0183161 | A1 | 7/2012 | Agevik et al. | |
| 2015/0073262 | A1 | 3/2015 | Roth et al. | |
| 2015/0124975 | A1 | 5/2015 | Pontoppidan | |
| 2015/0312694 | A1 | 10/2015 | Bilinski et al. | |
| 2015/0373477 | A1 | 12/2015 | Norris et al. | |
| 2015/0382127 | A1 | 12/2015 | Sun et al. | |
| 2016/0379041 | A1 | 12/2016 | Rhee et al. | |
| 2017/0048641 | A1 | 2/2017 | Franck | |
| 2017/0257723 | A1 | 9/2017 | Morishita et al. | |
| 2018/0218507 | A1 | 8/2018 | Hyllus et al. | |

FOREIGN PATENT DOCUMENTS

| | | | |
|---|---|---|---|
| WO | 2017116308 | A1 | 7/2017 |
| WO | 2017202634 | A1 | 11/2017 |

OTHER PUBLICATIONS

Yukio Iwaya, "Individualization of head-related transfer functions with tournament-style listening test: Listening with other's ears," Acoustical Science and Technology, 2006, vol. 27, Issue 6, Japan.

Slim Ghorbal, Theo Auclair, Catherine Soladie, & Renaud Seguier, "Pinna Morphological Parameters Influencing HRTF Sets," Proceedings of the 20th International Conference on Digital Audio Effects (DAFx-17), Sep. 5-9, 2017, Edinburgh, UK.

Slim Ghorbal, Renaud Seguier, & Xavier Bonjour, "Process of HRTF individualization by 3D statistical ear model," Audio Engineering Society's 141st Convention e-Brief 283, Sep. 29, 2016-Oct. 2, 2016, Los Angeles, CA.

Robert P. Tame, Daniele Barchiesi, & Anssi Klapuri, "Headphone Virtualisation: Improved Localisation and Externalisation of Non-individualised HRTFs by Cluster Analysis," Audio Engineering Society's 133rd Convention Paper, Oct. 26-29, 2012, San Francisco, CA.

Meshram et al., "P-HRTF: Efficient Personalized HRTF Computation for High-Fidelity Spatial Sound," 2014 IEEE International Symposium on Mixed and Augmented Reality (ISMAR), 2014, pp. 53-61, Munich, Germany.

Dalena, Marco. "Selection of Head-Related Transfer Function through Ear Contour Matching for Personalized Binaural Rendering," Politecnico Di Milano Master thesis for Master of Science in Computer Engineering, 2013, Milano, Italy.

Cootes et al., "Active Shape Models—Their Training and Application," Computer Vision and Image Understanding, Jan. 1995, pp. 38-59, vol. 61, No. 1, Manchester, England.

Zotkin, Dmitry et al., HRTF Personalization Using Anthropometric Measurements, 2003 IEEE Workshop on Applications of Signal Processing to Audio and Acouistics, Oct. 19-22, 2003, p. 157-160, New Paltz, NY.

\* cited by examiner

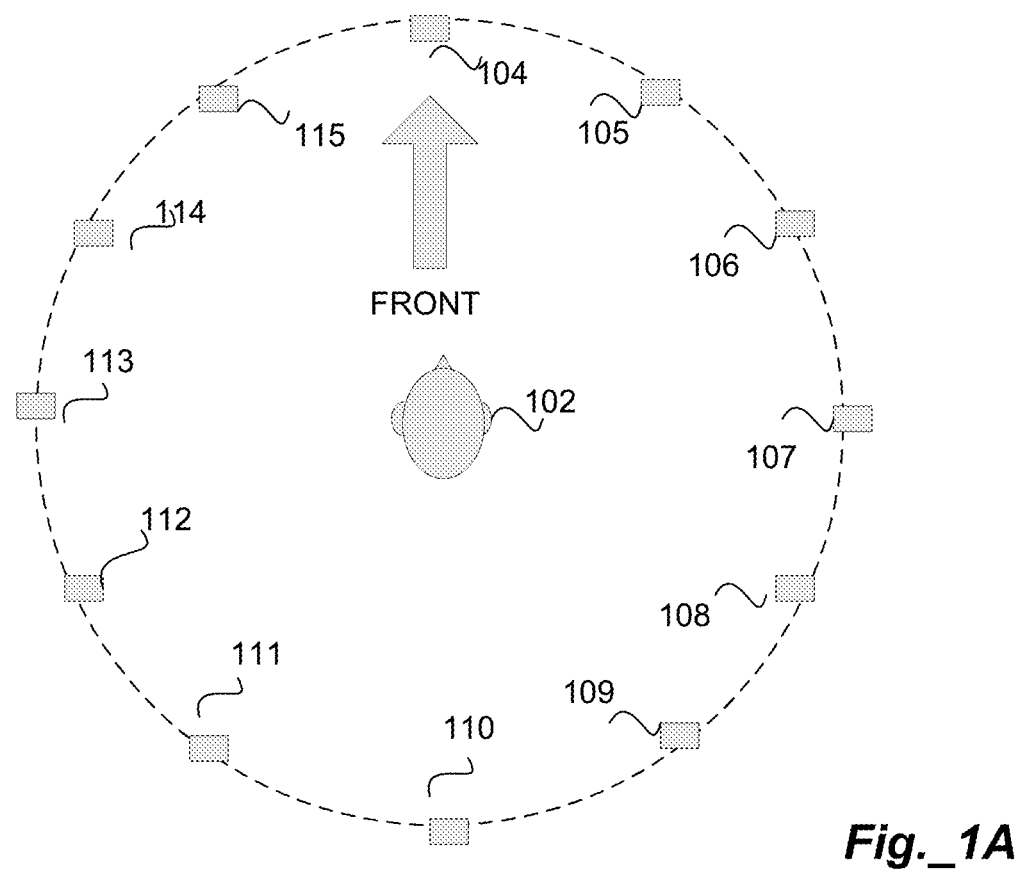
Fig._1A
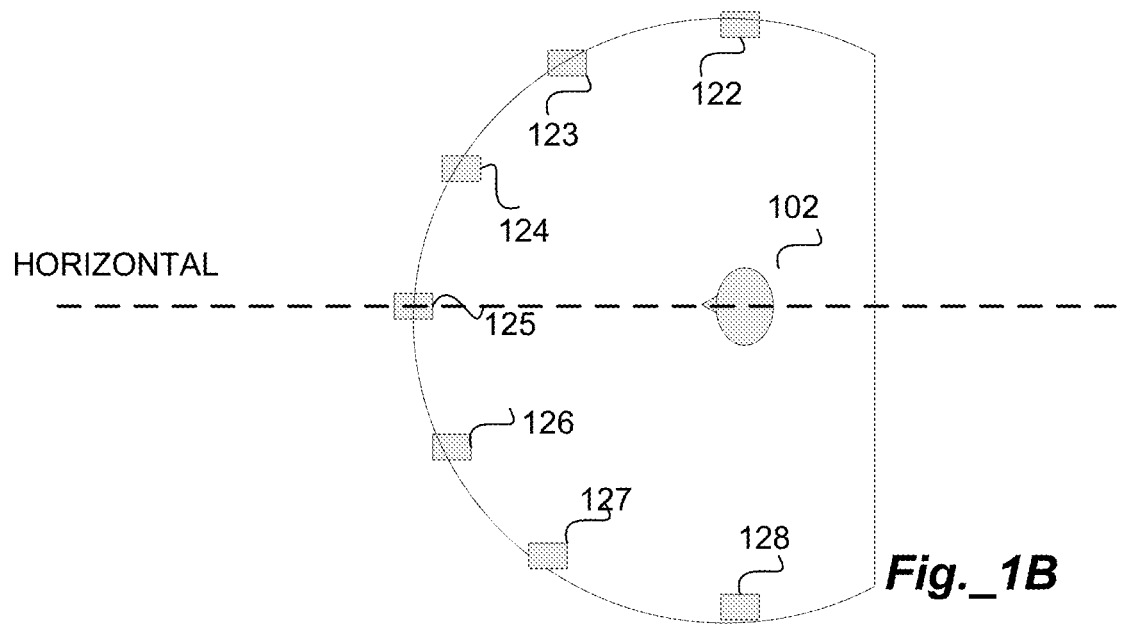
Fig._1B

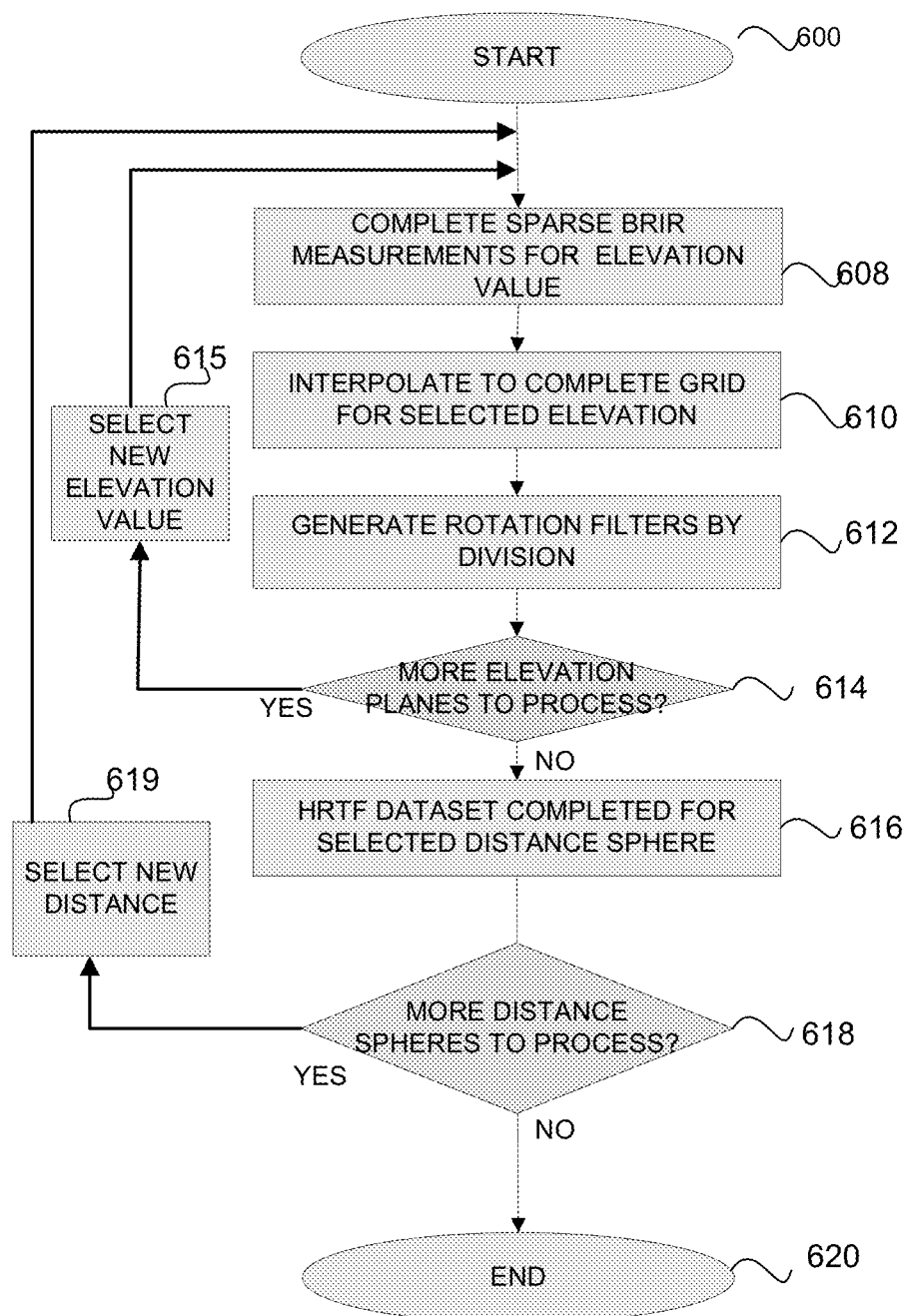
Fig._6A

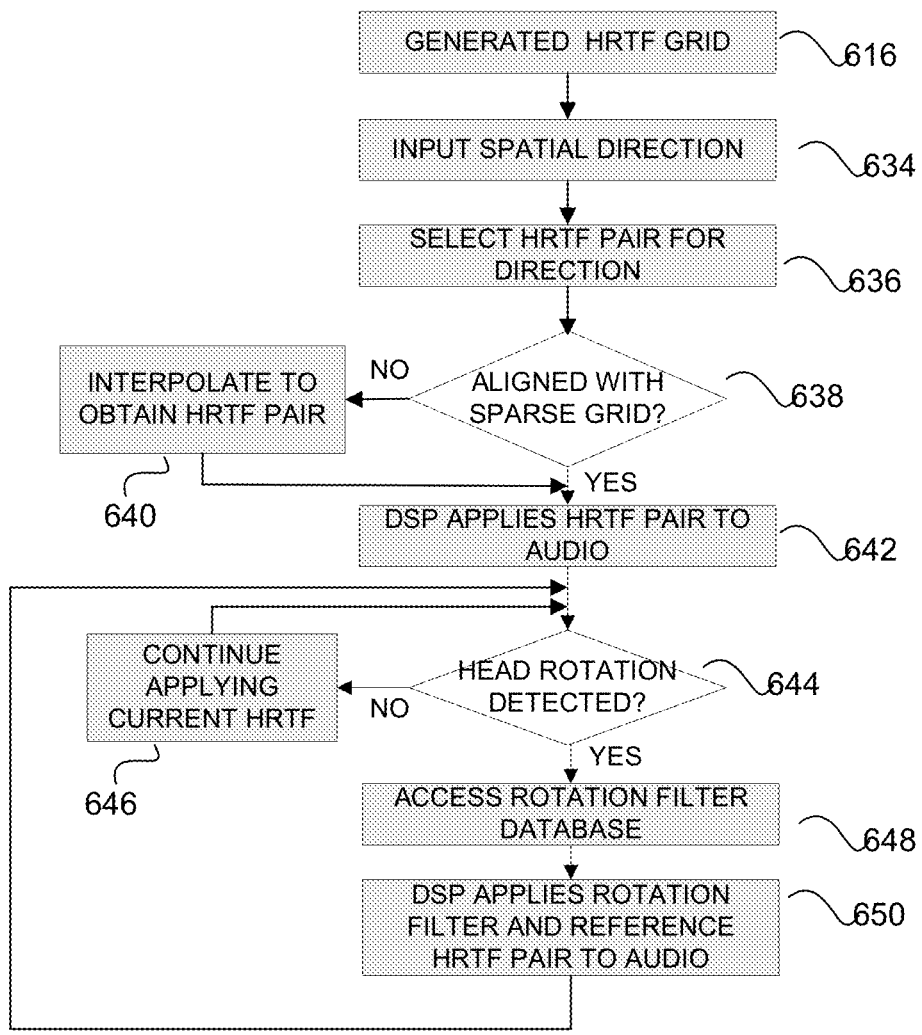
Fig._6B

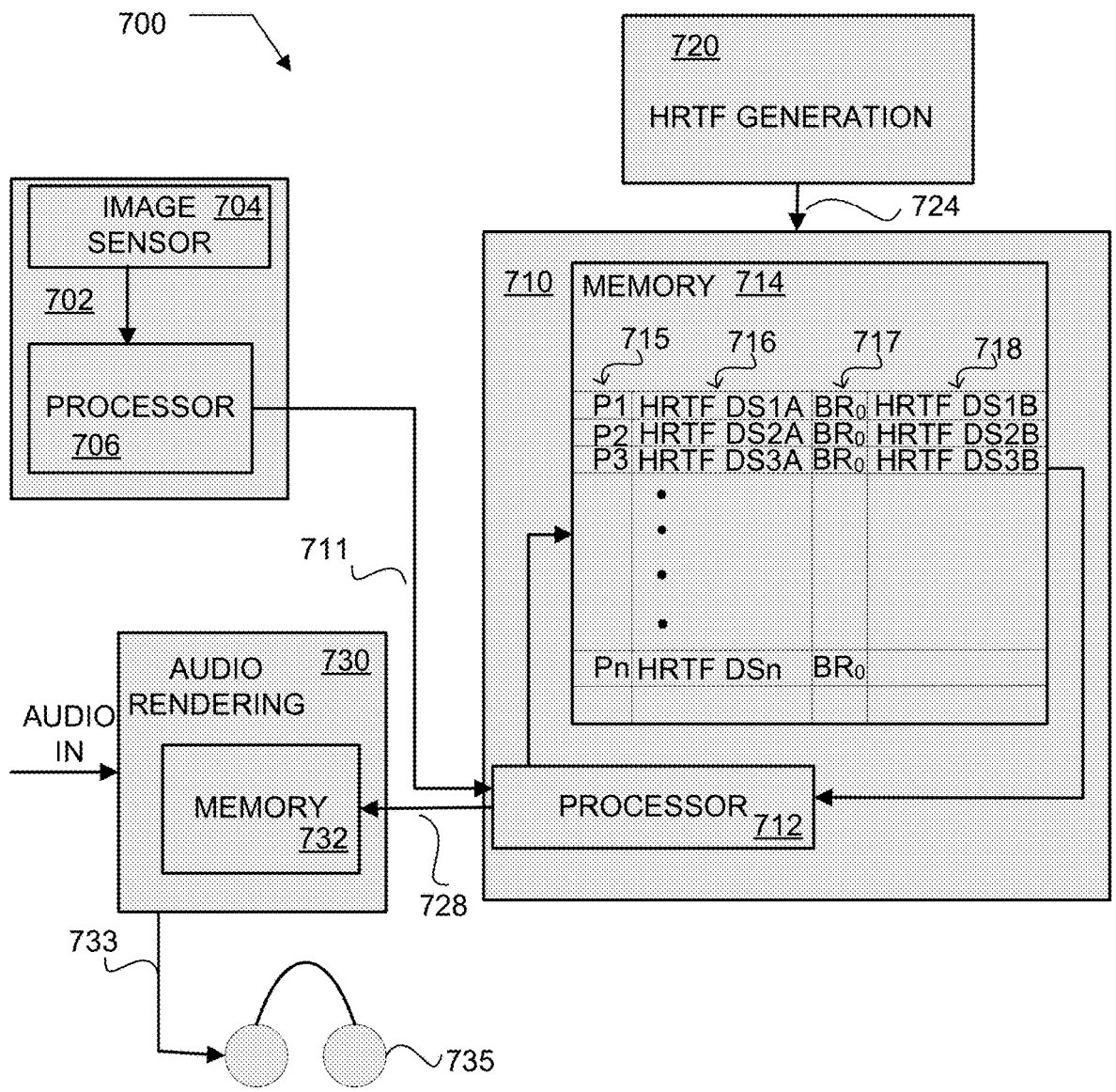
Fig._7

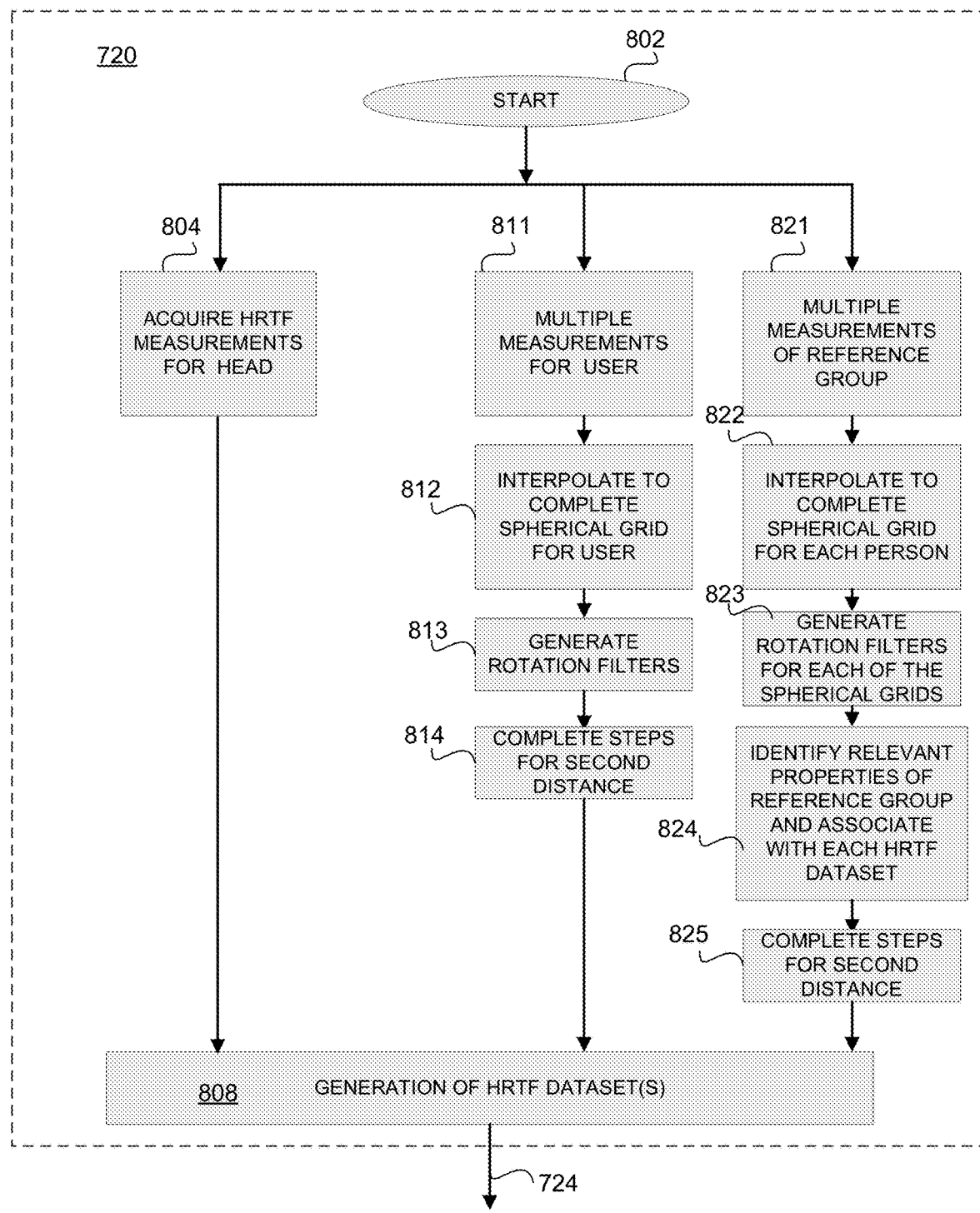
Fig._8

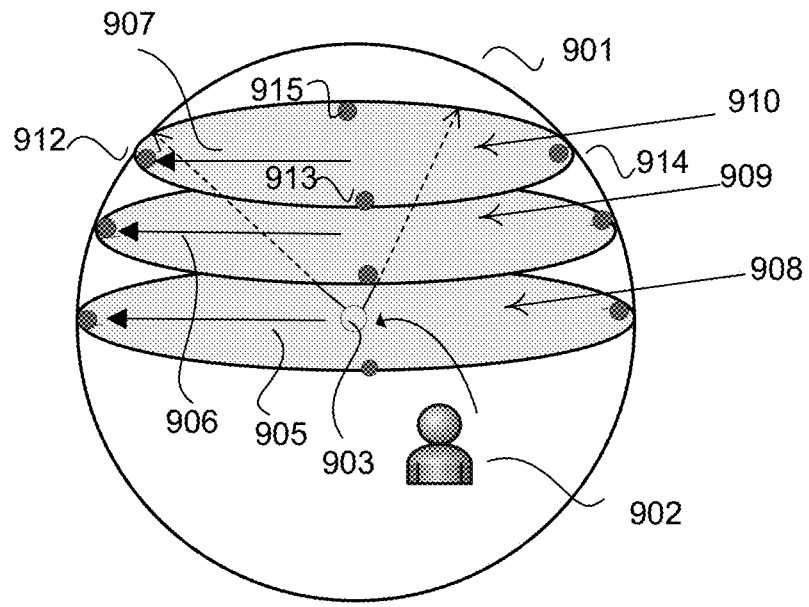
*Fig._9A*
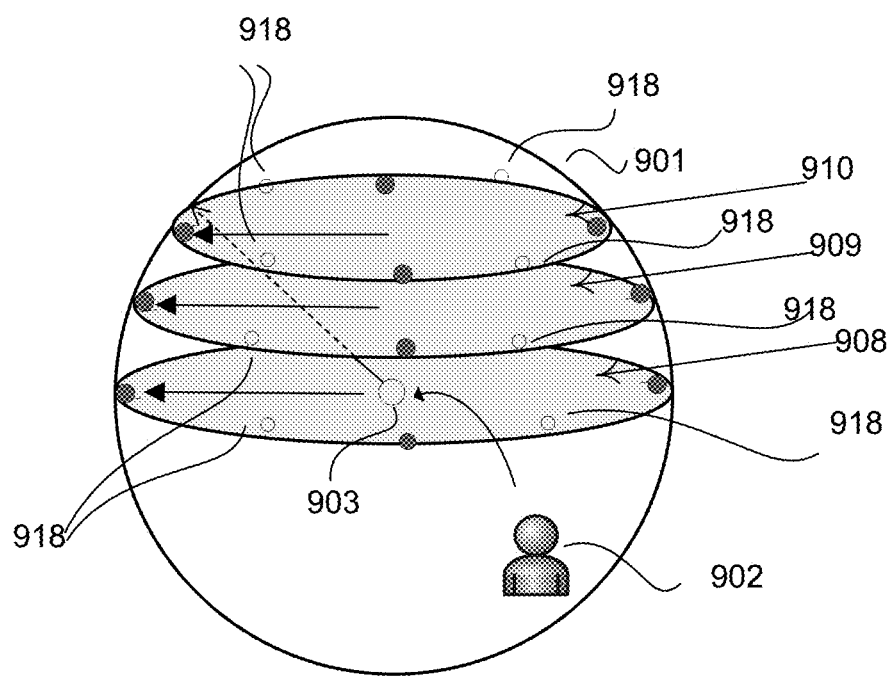
*Fig._9B*

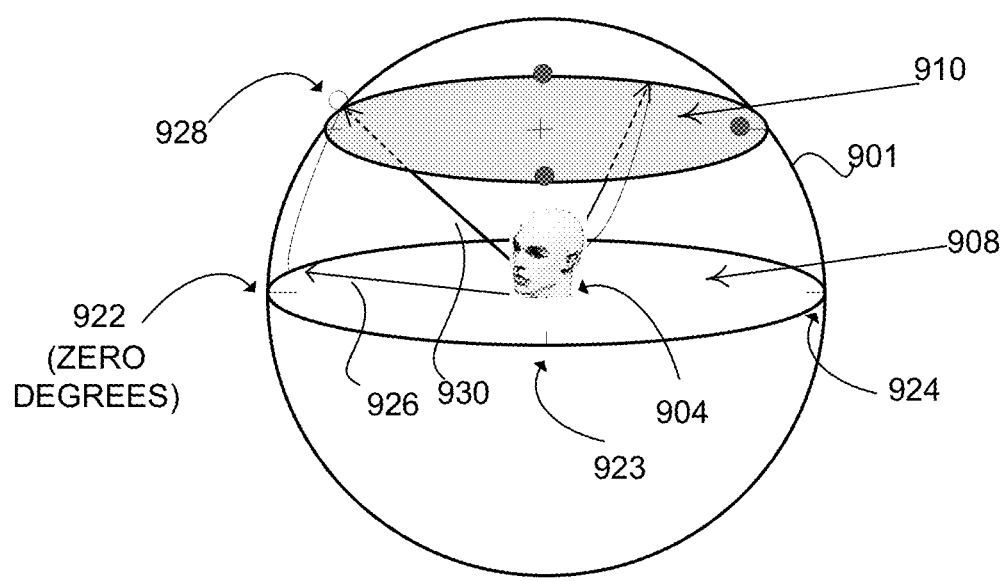
Fig._9C

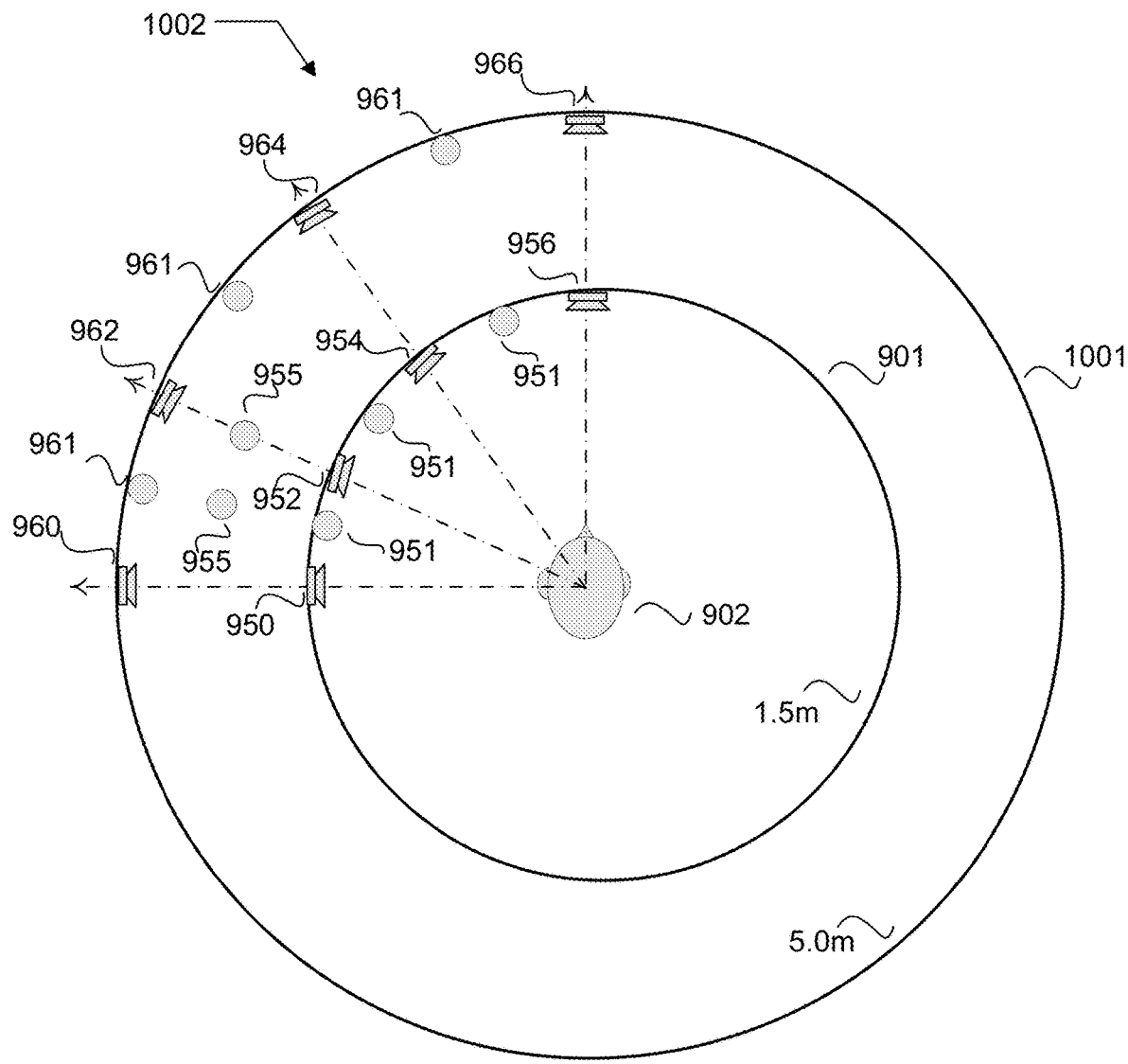
Fig._10

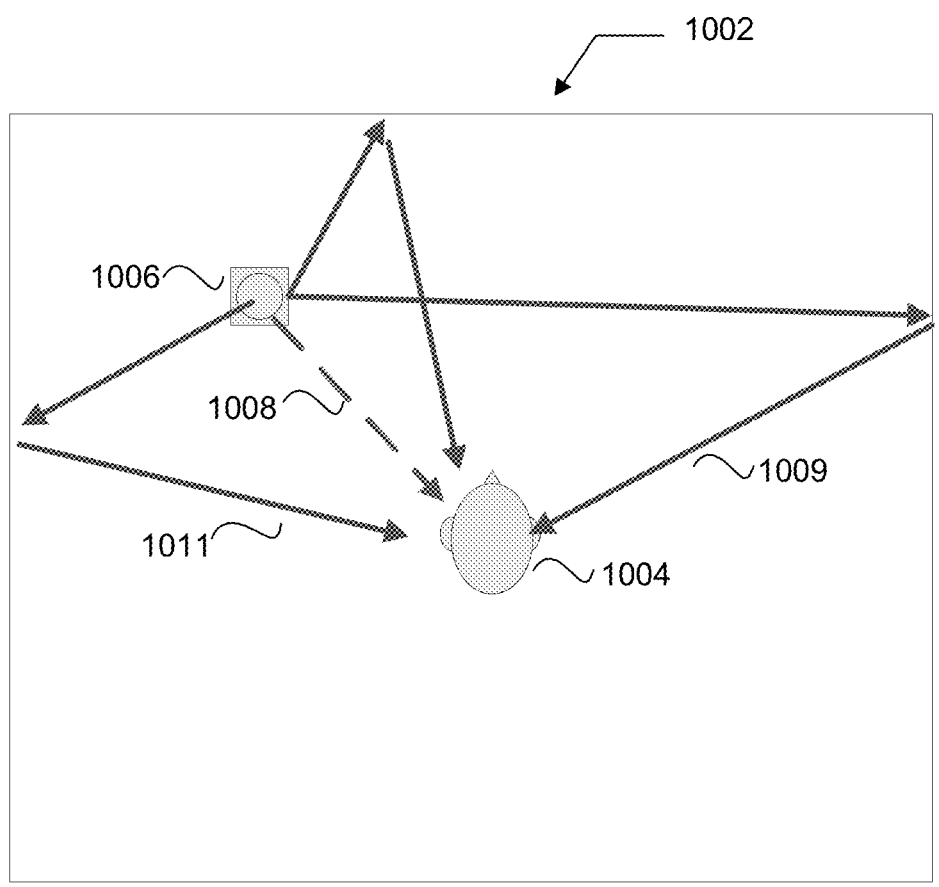
Fig._11

METHOD FOR GENERATING CUSTOMIZED SPATIAL AUDIO WITH HEAD TRACKING

CROSS REFERENCES TO RELATED APPLICATIONS

This application is a continuation of U.S. patent application Ser. No. 16/136,211, filed Sep. 19, 2018 and entitled "METHOD FOR GENERATING CUSTOMIZED SPATIAL AUDIO WITH HEAD TRACKING", which claims the benefit of and priority from U.S. Provisional Patent Application Ser. No. 62/614,482, filed Jan. 7, 2018, and titled, "METHOD FOR GENERATING CUSTOMIZED SPATIAL AUDIO WITH HEAD TRACKING", the disclosures of each of which are incorporated herein by reference in their entirety.

BACKGROUND OF THE INVENTION

1. Field of the Invention

The present invention relates to methods and systems for rendering audio over headphones with head tracking enabled. More particularly, the present invention relates to exploiting efficiencies in creating databases and filters for use in filtering 3D audio sources for more realistic audio rendering and also allowing greater head movement to enhance the spatial audio perception.

2. Description of the Related Art

The practice of Binaural Room Impulse Response (BRIR) processing is well known. According to known methods, a real or dummy head and binaural microphones are used to record a stereo impulse response (IR) for each of a number of loudspeaker positions in a real room. That is, a pair of impulse responses, one for each ear, is generated. A music track may then be convolved (filtered) using these IRs and the results mixed together and played over headphones. If the correct equalization is applied, the channels of the music will then sound as if they were being played in the speaker positions in the room where the IRs were recorded. This is one way in which the audio perception expected from multichannel source material designed for a plurality of speakers in a room can be replicated over headphones. For clarification purposes, a brief discussion of the transfer function and impulse response terms is provided. In general, HRTF stands for Head Related Transfer Function, which is the measurement of the transfer function from the speaker to the ear in an anechoic chamber so as to describe the direct path of the sound. In contrast, the BRIR or Binaural Room Impulse Response, provides the impulse responses of a room, to add the corresponding reverberation to an audio source. Its associated transfer function is sometimes referred to herein as the Binaural Room Transfer Function (BRTF).

The HRTF characterizes how each ear receives sound from a point in space, and depends on the characteristics of the head including the shape, size, and density of the head, and the shape and size of the ears and is derived from a measurement of the Head Related Impulse Response (HRIR). The HRIR is typically measured in an anechoic chamber so that it only contains information related to the head and does not include any room reverberation. HRIRs are quite short; typically, a dozen of milliseconds or so.

BRIR processing rendered through headphones provides a realistic impression of listening to music in a room, provided that the listener does not move his head. However, it is typical for listeners located in real rooms listening to a plurality of real loudspeakers to move their heads relative to the speaker locations. Even the smallest movement of the head results in small changes in the relative positions of the speaker with respect to the head, particularly the angular orientations, and should generate at least small perceptible changes in the spatial audio perceptions of the listener. To the listener, the sound is perceived as coming from a slightly different direction. The listener's ability to perceive the direction of a sound source is tied to the differences in time that the audio source is sensed at each ear [i.e., the interaural time differences ("ITD")], the differences in sound levels at each ear [generally referred to as either "Interaural Level Difference" (ILD), or "Interaural Intensity Difference" (IID)], and spectral shaping caused by the anatomy of the pinna of the ear. Although these small movements of the head may cause only modest changes in the spatial scene perceived by the listener they are important for providing the listener realism and recognition of his role as an independent actor in a real scene. What is needed is an efficient way for detecting small head movements and altering the processed product of the impulse response and the audio source signal to generate greater realism in the audio rendering over headphones.

SUMMARY OF THE INVENTION

To achieve the foregoing, the present invention provides in various embodiments a processor configured to provide binaural signals to headphones as implemented and modified by the results from head tracking hardware to provide an extra dimension of realism to binaural replication of audio over headphones. Moreover, in various embodiments of the present invention, efficient head tracking modifications of audio processed by Binaural Room Impulse Response filters are made using only modest increases in memory storage requirements. The BRIR includes room reverberation, which can be many hundreds of milliseconds in length depending on the size of the room. Since the HRIRs are much shorter than BRIRs, HRIRs can be modelled using much shorter filters. As will be explained later in more detail with respect to embodiments of the invention, the filtering operations may be carried out using time-domain, frequency-domain or partitioned frequency domain convolution. As used in this specification, Binaural Acoustic Impulse Responses (BAIRs) refer to measurements in spatial audio that reflect the effects of the spectral shaping and other changes caused by the acoustic environment including the properties of the head, torso, and ears; the properties of the loudspeakers in the acoustic environment; and reverberations occurring in the environment. The Binaural Room Impulse Responses (BRIRs) and Head Related Impulse Responses (HRIRs) discussed earlier are both subsets of Binaural Acoustic Impulse Responses. The term Binaural Acoustic Transfer Function (BATF) refers herein to the transfer function characterizing the receipt of sound based on measurements of the Binaural Acoustic Impulse Responses. That is, the BATF is hereby defined to cover with a single term both HRTFs and BRTFs. Similarly, the BAIR is defined to cover both HRIRs and BRIRs.

In another embodiment, savings in the space needed to store impulse responses or HRTF databases are achieved by sampling the impulse response less frequently than in conventional methods. This sampling at coarser intervals reduces the number of data measurements required to generate a spherical grid and reduces the time involved in capturing the impulse responses. Impulse responses for data points falling between the sampled data points are generated in several embodiments by interpolating in the frequency domain.

Briefly, an overview of the operation of one embodiment for head tracking modifications is provided by the sample described below. When the user is looking straight forward in the reference position (i.e., 0 degrees azimuth), the processor relies strictly on the BRIRs for the relevant channels. So processing will deliver audio based on a BRIR recorded from the front-left speaker for the left channel (at about −30 degrees azimuth), and the BRIR recorded from the front-right speaker (at about +30 degrees) for the right channel. Thus, in this case, since there is no movement of the head from the reference position, the result is exactly the same as without head tracking.

When the head moves, ideally the BRIRs should change. For instance, when the head turns to the right by 5 degrees, the right channel should be filtered using a BRIR recorded with 25 degrees azimuth instead of 30 degrees, and the left channel should be filtered using a BRIR recorded at −35 degrees instead of −30 degrees.

However, the memory requirements for this configuration are considerable. Two Impulse Responses (IRs) are recorded for each speaker position, and each IR is likely to be at least 200 msec long to capture the reverberation of even a small room. The BRIRs will incorporate both a) anechoic transfer functions provided directly to the ear, and b) room reverberations transfer functions. A common multichannel room arrangement with five speaker positions and recording at 48 kHz requires storage for 96 k filter coefficients for each angle of the head. If we want to have a new set of filters for every two degrees of azimuth and every two degrees of elevation between −45 and +45 degrees, this would require storage for over 700 million coefficients.

In addition, the processing cost would be increased. Frequency-domain ('fast') convolution is generally used for large convolutions of this kind because its processing cost is much lower. However, when using fast convolution and changing from one set of filters to another, a cross-fade between 'old' and 'new' filters is required, which means that for a short period, two convolutions must be performed. This will double the processing cost whenever the head is moving. Since the signal processing hardware must be specified to cater for the highest processing bandwidth, this will either double the hardware cost, or, if the processing hardware cannot be changed, the length of the filters will have to be halved. This will affect audio quality.

The necessary filtering operation may be carried out using time-domain, frequency-domain or partitioned frequency domain convolution. Partitioned convolution does not necessarily need to take place in the frequency domain but often does. The partitioned convolution embodiment involves splitting the impulse response into a series of shorter segments. The input signal is then convolved with each segment. The results of these separate convolutions are stored in a series of memory buffers. The output signal is created by summing together the appropriate buffers. One advantage of this approach is that it reduces latency from the length of the IR to the length of each segment. The latter is preferred in some embodiments, although, in other embodiments, the methods described here will work in conjunction with the other two as well.

According to various embodiments of the present invention, realism is obtained with a more efficient and simple system. Preferably either a single set of BRIRs is used or alternatively a reduced set of BRIRs is used and combined with a set of rotation filters to convert the BRIR for a first position to a BRIR for a second and different position. As used herein rotation filters refer to transfer functions to convert the BRIR for a first position to a BRIR for a second and different position, for example as might be required after head rotation of the listener is detected.

According to one embodiment, the system for generating spatial audio over headphones with head tracking comprises at least one processor implementing FIR filters that combine time domain FIR rotation filters with Interaural Time Delay circuitry.

Accordingly, the invention embodiments offer an effective solution for a variety of spatial audio over headphone applications.

These and other features and advantages of the present invention are described below with reference to the drawings.

BRIEF DESCRIPTION OF THE DRAWINGS

FIG. 1A is a diagram illustrating various speaker locations in azimuth around a listener's head for generating a sparse HRTF or BRIR database in accordance with embodiments of the present invention.

FIG. 1B is a graphical representation illustrating various speaker locations in elevation for generating a sparse BRIR database in accordance with embodiments of the present invention.

FIG. 6A is a flowchart reflecting the generation of a sparse HRTF grid via a Capture System in accordance with embodiments of the present invention.

FIG. 6B is a flowchart reflecting a Playback system with headtracking modifications applied to the selected HRTF pair in accordance with embodiments of the present invention.

FIG. 7 is a diagram of a system for generating HRTFs for customization, acquiring listener properties for customization, selecting customized HRTFs for listeners, providing rotation filters adapted to work with relative user head movement and for rendering audio modified by HRTFs in accordance with embodiments of the present invention.

FIG. 8 is a flowchart illustrating methods of generating HRTF Datasets by acquisition and measurement in accordance with embodiments of the present invention.

FIG. 9A is a diagram illustrating generation of a sparse spherical grid around the listener in accordance with one embodiment of the present invention.

FIG. 9B is a diagram illustrating the results of interpolation as applied to the spherical grid of FIG. 9A around the listener in accordance with one embodiment of the present invention.

FIG. 9C is a diagram illustrating resultant vectors generated by head movement and selection of associated rotation filters in accordance with embodiments of the present invention.

FIG. 10 is a diagram illustrating spherical databases at different distances in accordance with embodiments of the present invention.

FIG. 11 is a diagram illustrating direct sound and reflections in a room in generating customized HRTFs in accordance with embodiments of the present invention.

DETAILED DESCRIPTION OF PREFERRED EMBODIMENTS

Figure 2:
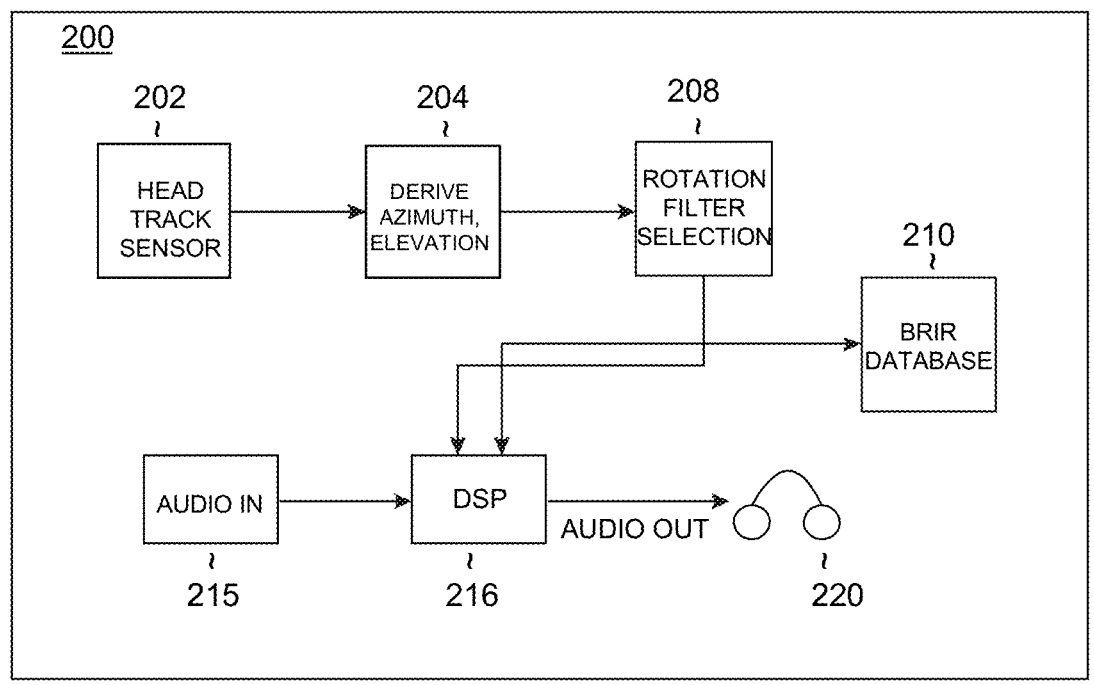
FIG. 2 is a diagram illustrating headphone circuitry having head tracking features in accordance with one embodiment of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

The HRTF of a person is unique mainly due to his unique ear, head, shoulder and torso. A generic HRTF, usually created by taking an "average" head, may not match the user's HRTF and result in elevation error, front-back confusion, and poor externalization. The best results in providing spatial audio are achieved by providing dense HRTF databases customized to the listener. This is important to the objective of providing accurate filtering, i.e., that the filter coefficients chosen provide the selected listener with an accurate perception that the sound is coming from the selected direction. Of course, generating a customized database of HRTF's with many data points requires more memory. Typically, an HRTF database will provide HRTF pairs for data points spaced no more than 15 degrees apart in azimuth and 15 degrees in elevation. These measurements are taken ideally to generate a full spherical grid around the listener. Preferably, and in order to provide even more accuracy in the HRTF filters, the data points are located as close as 3 degrees to each other. This of course generates a huge spherical HRTF grid that requires considerable memory storage. Moreover, measuring the HRTF of a person is a tedious and laborious process requiring a quiet room and the user to sit very still over a long period of time. The user may feel fatigue due to the long HRTF measurement process, and be unable to keep still, resulting in less than ideal measurement. The HRTF is no longer accurate even if the user moved her head by a mere centimeter during the measurement. Regarding the actual HRTF capture process, typically a loudspeaker is rotated around the user's head to correspond to a regular and typically dense spherical grid, and the whole process may take hours. The output of the measurement process is an HRTF map, which is list of HRTF pairs indexed by direction (azimuth, elevation) and may also include a tilt measure. This map is also sometimes referred to as an HRTF grid, spherical grid, or HRTF dataset. The spherical grid concept denotes that HRTFs can be used in 360 degrees of direction on a plane around the listener's head and also 360 degrees in elevation above and below this horizontal plane to assist the listener in accurate perception of directional sound. To appreciate the measurement time involved and by way of example, the KEMAR HRTF database from MIT uses a measurement grid with azimuth increments of 5 degrees. Also, the CIPIC HRTF database from UC Davis uses a measurement grid with azimuth increments of 5.625 degrees. Relative to these even the commonly used IRCAM dataset using spacings of 15 degrees, though somewhat coarse, still takes considerable time for capturing a full spherical grid of data points, i.e., an HRTF map.

Given these drawbacks, it is desirable to shorten the measurement process while still providing acceptable accuracy.

In use, given a head position (azimuth, elevation), conventional methods typically use the azimuth and elevation parameters as indices to "look up" in an HRTF map or grid the proper HRTF and use the "nearest" HRTF, or an interpolation of surrounding HRTFs. A straightforward interpolation in the time domain is the easiest approach, but it does not work very well. This is because interpolation of the time domain response can result in destructive interference if the neighboring Impulse Responses (IRs) used for the interpolation are out of phase. Several methods have been proposed to avoid this problem. One example is to apply time warping so that the IRs become time aligned before interpolating. However, this is a complicated procedure because the interpolated IR has to be modified to take into account the time warping.

Due to the above issues, in preferred embodiments we use frequency-domain interpolation which provides good results even when the angle between the HRTFs is large. The present invention provides embodiments for interpolating in the frequency domain. In more detail, one method involves interpolating the magnitudes and phases of the HRTFs. Performing interpolation in the frequency domain requires operations such as the Fast Fourier Transform (FFT) to convert to the frequency domain and an inverse FFT to convert back to the time domain. These are known to those of skill in the art and thus further explanation as to details in conversion blocks is believed unnecessary here.

The number of data points (grid points) used for the interpolation depends on a number of factors. These factors include the grid spacing (uniform where the spacing is constant over the whole grid, or non-uniform), and the location where the interpolated point lies relative to the grid points. Depending on the scenario, optimum results are typically achieved in embodiments using 2 or 3 points, although in some embodiments of the present invention 4 points are used.

In various embodiments of the invention different interpolation methods are selected based largely on the coordinates of the interpolated point relative to the measured points. In a first embodiment adjacent linear interpolation is performed. This is the simplest method for interpolating the HRIRs. In this case the target angle is interpolated from two neighboring points. This method can be used when interpolating between points on the same plane (for example, azimuth angles with a fixed elevation, or elevation angles with a fixed azimuth), i.e. when the interpolated point lies on one of the grid lines.

In another embodiment, bilinear interpolation is selected. This is an extension of linear interpolation, and can be used when the interpolated point lies between the grid lines. For a given target location, the interpolated HRIR is approximated as a weighted sum of HRIRs associated with the four nearest points. These points form a square or rectangle around the target location.

In yet another embodiment, spherical triangular interpolation is selected. This is really a modified version of bilinear interpolation that is able to work with non-uniform measurement grids, i.e., when the nearest four points do not form a square or rectangle. In this case the three nearest points are chosen that form a triangle around the target location. As with the bilinear interpolation method, the interpolated IR is approximated as a weighted sum of HRTFs associated with the nearest points. In this case, however, the interpolation formula is more complicated.

In summary, the adjacent linear interpolation embodiment uses 2 HRIRs for interpolation, bilinear interpolation uses 4 points for the interpolation, and spherical triangular interpolation uses 3 points for the interpolation. Whichever method is used depends on the coordinates of the point being interpolated and whether the grid spacing is uniform or not.

Frequency domain interpolation allows us to use coarser measurement intervals (e.g. 30-60 degrees instead of say 5 degrees), which significantly reduce the number of measurements needed to cover a spherical map or grid. In other words, with frequency domain interpolation we perform a sparser sampling of the sphere surrounding the listener's head. With a reduced number of loudspeaker positions, the capturing time is significantly reduced. This reduces the demand placed on the user to keep still (which improves HRTF quality), and only requires the room to be available for a shorter period of time.

In other embodiments, reduction in HRTF measurements is provided by capturing HRTFs in a non-regular grid. Not all head poses are equally important. For example, the frontal 60 degrees cone may be deemed more important in certain use-cases. The grid may be denser in that cone, while rear and bottom quadrants may have sparser grids.

In yet another embodiment we achieve efficiencies by using multiple speakers. Current methods such as IRCAM typically use one loudspeaker mounted on a movable arm and a rotating chair to span the spherical grid. In this embodiment, we setup multiple speakers, and measure multiple HRTFs simultaneously and map them to a spherical grid, further reducing the time taken for measurements. In other words, for a speaker set up with 5 speakers around the listener (equipped with 2 in-ear microphones) we sequentially activate each of the 5 speakers, resulting in 5 readings for each position the listener takes relative to the speakers. Further still, reduction in HRTF capture measurements can be achieved with all of the above-mentioned techniques by recognizing symmetry. That is, if we assume that the room and user's pinna, head, and torso are symmetrical, we only need to measure the HRTF on half the sphere, and mirror the HRTF to the other half.

FIG. 1A is a diagram illustrating various speaker locations in 360 degrees azimuth around a listener's head for generating an HRTF or BRIR sparse grid in one step of one of the invention embodiments. Ideally, the speaker positions such as including 104 through 115 in azimuth around the listener 102 are 3 degrees apart for maximum accuracy. Similarly, in FIG. 1B, the speaker locations 122, 123, 124, 125, 126, 127, and 128 would ideally reflect angular inclination and declination of 3 degrees from the nearest respective speaker position in elevation. Using the techniques of the present invention, comparable accuracies can be achieved with a "sparse" HRTF grid where the adjacent speaker positions may be in the 30 to 60 degrees range, followed by frequency domain interpolation steps of the present invention embodiments. FIG. 1B is a graphical representation illustrating various speaker locations in elevation for generating an HRTF database.

In the example embodiment above, the BRIR pairs and HRIR pairs are generated at least in part by recording the responses caused by movement of the speakers relative to a stationary head position.

In alternative embodiments, the BRIR pairs and HRIR pairs are generated at least in part by recording the responses caused by head movement relative to a stationary speaker. The manipulation of the head position relative to the speakers is implemented and modifications made to the applicable transfer functions based on such manipulation. For example, when the head is rotated, say to 45 degrees left of the zero degree reference position, a different effect occurs versus the situation wherein the speaker movement occurs relative to the head. This difference is due in large part to the changed relationship between the head and the rest of the body. For most measurement situations where speaker movement occurs relative to the listener, the head is symmetrically placed in relation to the shoulders. This of course is not the case when the speaker remains stationary and the head is rotated. Generating BAIRs and their related BATFs that recognize and compensate for such movements provide improvements in the accuracy of the spatial perception of the audio.

For another example, changing the speaker elevation has a totally different BAIR compared to moving the head physically up or down in relation to the speakers which remain stationary. The BAIR changes not only for the rotation of the head as noted above but also for inclination/declination of the head and tilting of the head. In one preferred embodiment, generation of the HRTF dataset or rotation filter dataset includes additional data for head rotation in addition to using multiple speaker locations for capturing the HRTFs and BAIRs in general.

FIG. 2 is a diagram illustrating headphone circuitry having head tracking features in accordance with one embodiment of the present invention. In the system 200, a head tracking sensor 202 is coupled to the listener's head to measure changes in the user's head orientation. The output from this sensor is used to generate azimuth and elevation information in azimuth block 204. The derived azimuth and elevation information is then transmitted to a rotation filter database 208. The DSP processor 216 uses the information in BRIR database 210 (an example of a BAIR database) preferably storing customized HRTFs/BRIRs for the listener and the rotation filter selection corresponding to the elevation and azimuth parameters to process (filter) the input audio 215 to generate binaural audio signals to the headphone transducers 220.

Figure 3:
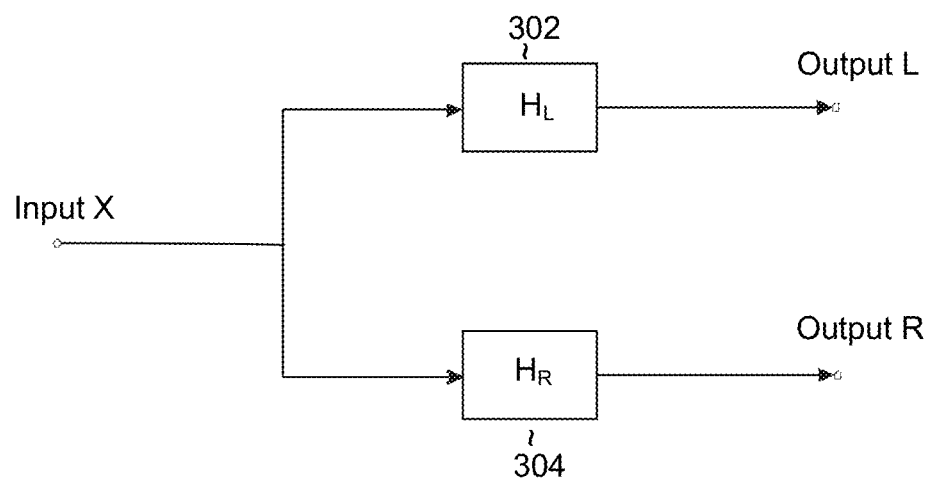
FIG. 3 is a diagram illustrating processing for a single virtual speaker for a specified location in accordance with one embodiment of the present invention.

FIG. 3 illustrates the processing for a single virtual speaker for a specified location. The input audio signal is processed by a pair of transfer functions 302 and 304 to create the perception of the virtual speaker in the desired location. By using a single set of BRIRs (or alternatively a reduced set of BRIRs) instead of a set for each different orientation of the head the current invention in various embodiments substantially avoids the problems described earlier, while maintaining realism. This single or reduced set of BRIRs is combined with a set of 'rotation filters' which convert the BRIR for a reference position to the BRIR for a different position. These rotation filters can be very short, thus saving on memory and processing cost. This diagram shows the processing for a single virtual speaker in a specific position relative to the head. In the description that follows we derive the transfer functions that we alternatively call rotation filters for converting the HRTF for an initial position to that for a second position. These rotation filters enable us to replace a database with complex filters (BRIRs for each possible position of the head) with shorter and simpler filters.

We then express the transfer functions $H_L$ and $H_R$ as a product of two transfer functions:

$$H_L = H_{AL} \cdot H_{TL}$$

$$H_R = H_{AR} \cdot H_{TR} \tag{1}$$

$H_{AL}$ and $H_{AR}$ are the anechoic transfer functions. They are the result of measurement of the transfer function from the speaker position to the ear in an anechoic chamber, and are typically called HRTFs. $H_{TL}$ and $H_{TR}$ are essentially the room reflections—this is what is left if the HRTF is removed.

Now assume that we have two head-relative speaker positions. Position zero is the position of one of the speakers when the head is looking straight forward. In this case the head-relative position of the speaker is the same as the absolute position. Position 1 is the head-relative position of the same speaker when the head is moved in some way, and thus this head-relative position is no longer the same as the absolute position. The transfer functions for these two positions are:

$$H_L^0 = H_{AL}^0 \cdot H_{TL}^0$$

$$H_R^0 = H_{AR}^0 \cdot H_{TR}^0$$

and $$H_L^1 = H_{AL}^1 \cdot H_{TL}^1$$

$$H_R^1 = H_{AR}^1 \cdot H_{TR}^1 \tag{2}$$

We need a pair of filters $H_{DL}$ and $H_{DR}$ (the rotation filters) which compensate for the difference in position. Thus:

$$H_1^L = H_L^0 \cdot H_{DL}$$

and $$H_R^1 = H_R^0 \cdot H_{DR} \tag{3}$$

Substituting (2) into (3) we get:

$$H_{AL}^1 \cdot H_{TL}^1 = H_{AL}^0 \cdot H_{TL}^0 \cdot H_{DL}$$

and $$H_{AR}^1 \cdot H_{TR}^1 = H_{AR}^0 \cdot H_{TR}^0 \cdot H_{DR} \tag{4}$$

Now we assume that the reflections are the same irrespective of the head-relative position. Although this assumption is not entirely true, it is near enough to the truth for the results to be convincing. Thus:

$$H_{TL}^1 = H_{TL}^0 = H_{TL}$$

and $$H_{TR}^1 = H_{TR}^0 = H_{TR} \tag{5}$$

Substituting (5) into (4) we get:

$$H_{AL}^1 \cdot H_{TL} = H_{AL}^0 \cdot H_{TL} \cdot H_{DL}$$

and $$H_{AR}^1 \cdot H_{TR} = H_{AR}^0 \cdot H_{TR} \cdot H_{DR} \tag{6}$$

This enables us to cancel $H_{TL}$ and $H_{TR}$ from both sides of these equations and rearrange to yield:

$$H_{DL} = \frac{H_{AL}^1}{H_{AL}^0} \tag{7}$$

and $$H_{DR} = \frac{H_{AR}^1}{H_{AR}^0}$$

Thus, the transfer function of the filter we need is the HRTF for position 1 (the current head-relative speaker position) divided by the HRTF for position zero (the absolute speaker position).

Because HRTFs are anechoic, they contain no reverberation and can be accurately conveyed using short filters. Thus, the rotation filter can be short too. Experimentation has shown that an FIR filter with reduced number of taps to accommodate a shorter impulse response can be used. This offers considerable savings in the complexity of the FIR filters. For example, in the sample discussion earlier, for sampling at 48 kHz thousands of coefficients will be required (a 500 msec HRTF will require 500/1000*48000=24,000 samples, where sampling rate=48 kHz.

When the orientation of the head changes, the filter is changed and the filter coefficients must be updated. To avoid audio artifacts such as output signal discontinuities the transition between filters is handled directly by cross-fading the filter coefficients over a number of samples while processing is taking place, and thus the processing cost is only slightly increased when the head orientation changes in this embodiment.

Interaural Time Delay

The filters $H_L$ and $H_R$ shown in FIG. 3 may be expressed as the product of a time delay I and a zero-delay filter F:

$$H_L = F_L \cdot I_L$$

and $$H_R = F_R \cdot I_R$$

$I_L$ and $I_R$ are the interaural time delay (ITD) and arise because the sound from a source anywhere around the head other than on the sagittal plane will arrive at one ear before it arrives at the other. Thus, it will always be the case that at least one of them will be zero, and it will usually be the case that one is zero and the other positive. In the head-tracking situation the ITD needs to change as the head moves. In a given room, ITD is primarily a function of azimuth and head width. A normal head width is usually referred to as the interaural distance (the distance between the ears) and is usually assumed to be 0.175 m. When I is positive this corresponds to a positive $I_R$ and zero $I_L$ and vice-versa when I is negative.

Figure 4:
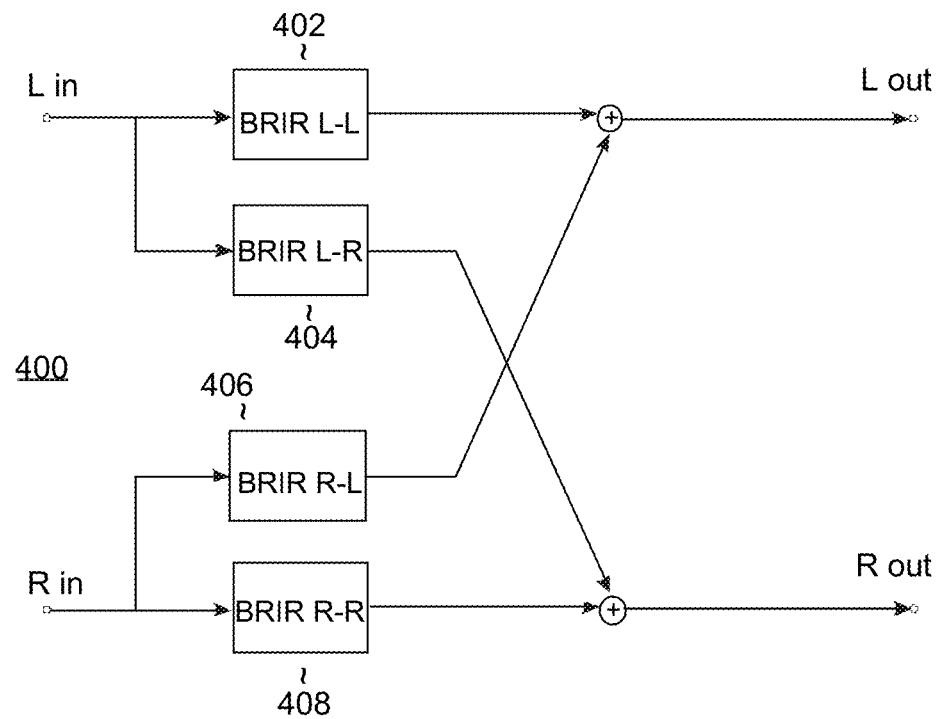
FIG. 4 is a diagram illustrating a conventional system for processing a stereo input signal without head tracking.

FIG. 4 shows a system 400 for processing without head tracking for a stereo input according to conventional methods. Here the ITDs are included in the BRIR filters 402, 404, 406, and 408.

Figure 5:
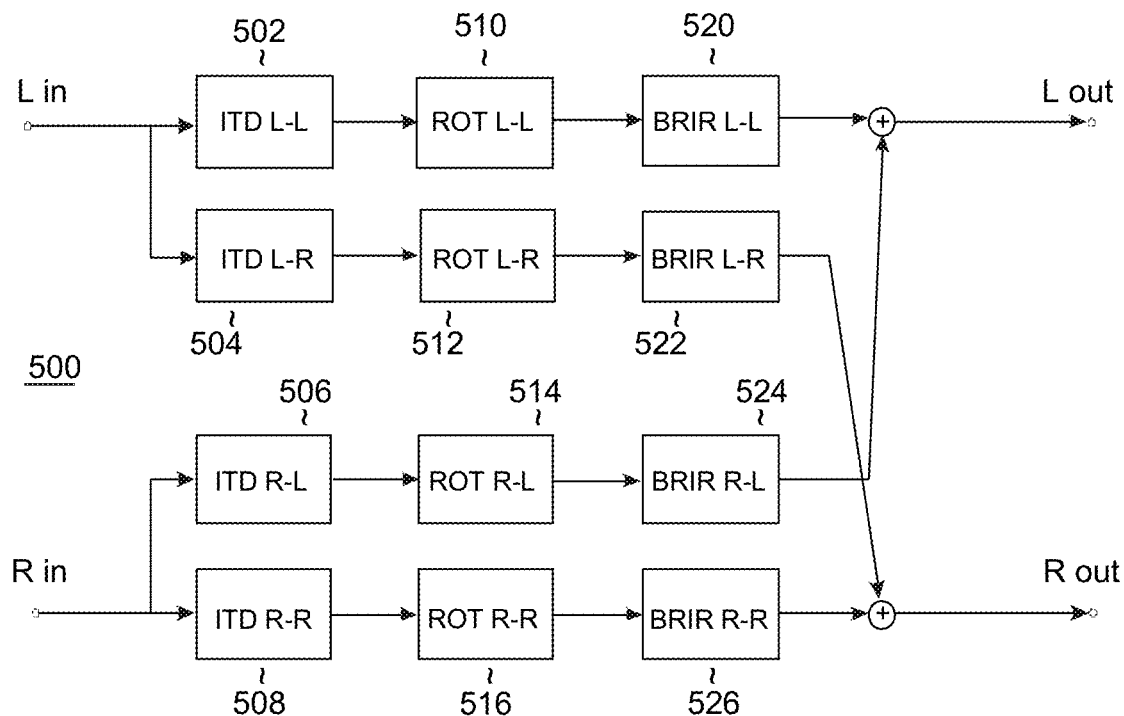
FIG. 5 is a diagram illustrating a stereo input with head tracking in accordance with one embodiment of the present invention.

FIG. 5 shows the processing with head tracking included in accordance with one embodiment of the present invention.

In this diagram:
The blocks labelled ITD . . . are the ITDs (i.e., 502, 504, 506, and 508)
The blocks labeled ROT (i.e., 510, 512, 514, and 516) are the time-domain FIR rotation filters, and
The blocks labeled BRIR (i.e., 520, 522, 524, and 526) are the zero-delay versions of the impulse responses. These may be carried out using any convolution method.

For more channels, this processing may be extended with more blocks like that above, and the results mixed together to produce a single output pair.

Implementation Options

The rotation filters require much less storage than would be the case if multiple BRIR filters were used, as described above. If we use FIR filters with reduced numbers of taps, then the number of coefficients needed to be stored is considerably reduced, instead of, for example, over 700 million using full length BRIRs. If DSP memory is sufficient, then this table of coefficients can be stored on it. However, it may be necessary to use external memory, in which case the coefficients can be transferred from external memory to the DSP in response to the head orientation. In one non-limiting embodiment this is implemented over a relatively low-bandwidth interface such as I2C.

To save memory further, the rotation filters may be stored on a coarser grid, and interpolation may be done in real time. HRTFs are often recorded on a coarse grid. For instance, the IRCAM HRTFs (see hrtf.ircam.fr) use a grid of only 187 points with 15 degree azimuth resolution, and a similar resolution for elevation. This means that the table of rotation filters needs storage for just under 120,000 coefficients. In one implementation, the rotation filters are stored at this resolution, and we interpolate them in real time.

The efficiency savings in using rotation filters can reduce both processing and memory demands. Two methods for reducing the size of the database are identified below. In the first method, given two BRIRs, and after the division process to generate rotation filters, we can significantly truncate the resultant BRIR in time domain while preserving "realism". In our derivation above, we assumed that the reflections are the same irrespective of the head-relative position. Hence, the "tail" of the resultant BRIR contains mostly reflections and may be truncated away, resulting in a filter having a smaller number of taps.

The efficiency savings from the second method include using shorter HRTF filters with large BRIRs and thus sacrificing very little accuracy. BRIRs are usually thousands of samples, while HRTFs (without the room response) may be much less than a thousand (for example, perhaps in a common case 512 samples each). In one preferred embodiment, we employ a separate HRTF database to generate the rotation filters (by dividing two HRTFs as disclosed in equation 7). These rotation filters can then be applied to a single captured large (for example a 24,000 sample) BRIR, for example for a source located at −30 degrees as part of a conventional stereo speaker setup.

To this point the specification has largely described real time methods for generating complete HRTF datasets from sparsely measured HRTF datasets. What follows is an overview of a system configured for generating a customized HRTF dataset for a new listener without inserting microphones into the ears of the new listener. Rather than real time calculation of interpolated entries for HRTF datasets, several embodiments rely on calculation of interpolated HRTF dataset values; rotation filter values; and BRIRs at the remote server.

As described previously, in order to provide the sense of directionality to a listener, an audio signal must be filtered by an appropriate transfer function (e.g. BATF pairs such as HRTF pairs or BRTF pairs) to give the listener cues as to the direction of the source. The term HRTF has been given different meanings by different users. For example, in some cases researchers refer to HRTFs as to referring to the spectral shaping that occurs when the sound arrives at the user's eardrums, particularly including the effects provided by the pinnae of the listeners ears but also including in the refraction and reflection effects from the listener's torso, head, and shoulders. In other cases the delays resulting from the time of the sound to arrive at the listener's ears are also included in the HRTF pair for a particular position in space around the listener. In the system described in the following paragraphs HRTFs are generally assumed to include the time delays reflecting the different sound path lengths for the two ears (ITDs) and to be limited to the anechoic transfer function between the sound source and the ears. In some cases however, when acoustic environment or room effects are included the broader term Binaural Acoustic Transfer Function is preferred. It should be noted that the operations described in this specification as applicable to HRTFs generally also apply to similar operations performed on BRIRs wherein additional acoustic environment effects such as room reverberations are modelled by the BRIRs' associated transfer functions. This generally should be apparent from the context.

Ultimately and in order to assist the user with properly spatially locating the virtual sound source an HRTF chosen for the specific azimuth, elevation, and in some cases distance must be applied to the audio signal before rendering. The specific HRTF is preferably one taken from an HRTF dataset containing HRTF pairs (i.e., one for each ear) for a large number of positions on a sphere surrounding the listener's head. For example, preferred embodiments provide granularity in the HRTF measurements and/or interpolated values such that HRTF pairs are provided for every 3 degrees in azimuth change and every 3 degrees in elevation. In other embodiments of the invention symmetry is utilized to reduce the number of measurements and time necessary to complete measurements.

When measurements are taken for an individual, a typical setup involves placing an in-ear microphone in each ear of the listener and recording the impulse responses generated for many positions of the sound source generally located on a sphere surrounding the listener. If the measurements are taken for each of the 7000 or so points on the sphere (based on readings above the horizontal plane) it is a painstakingly slow process but can provide accurate results for the listener. That is, an individualized HRTF or BRIR dataset is provided for that listener and made available to a rendering module in shaping an input audio signal for communication to a set of headphones. At the other end of the spectrum, insertion of microphones in the listener's ears can be avoided by using a generalized HRTF dataset. For example, HRTF datasets compiled by researchers from measurements taken with microphones inserted into a mannequin's head can be used. Alternatively, an entire HRTF dataset measured for one individual can be used for a second individual. Further still, an average HRTF dataset can be derived from a collection of measurements taken from a large number of individuals. In many cases these "general" HRTF datasets will perform poorly for a new listener by failing to enable the new listener to accurately spatially locate the virtual sound source. In various embodiments of the present invention, audio related physical properties of a new listener are identified and such properties are used to select one or more HRTF datasets from a candidate pool (i.e., a collection) of HRTF datasets. The selection is performed preferably by mapping the physical properties to similar metadata associated with each HRTF dataset in the collection. In one embodiment, if more than one HRTF dataset is identified as "close" or similar, an interpolation process takes place between the HRTF datasets. Once an HRTF dataset identified, the dataset is transmitted to the user, preferably to the user's rendering device for storage of the HRTF dataset.

FIG. 6A is a flowchart illustrating steps taken to capture in a system a general spherical grid of HRTFs or Rotation Filters for spherical grids of HRTF pairs surrounding a listener and at various distances in accordance with embodiments of the present invention. The flowchart reflects the generation of a sparse HRTF grid and headtracking modifications applied to the selected HRTF pair in accordance with embodiments of the present invention. Initially in step 602 the listener can be seated in a multispeaker room for generation of a customized HRTF database with speakers sequentially activated. In one case the resulting impulse response is recorded from the in-ear microphones placed on the listener. Generally, if further data points are required the process is repeated with new relative locations established by moving the listener's head or chair.

The method starts at step 600. At step 608 HRTF/BRIR measurements including room effects are completed to generate a sparse set of measurements for a particular elevation value. That is, measurements are made for all desired azimuth values at that elevation. If measurements are required at various head tilt positions (i.e., roll), measurements can be completed for each tilt position in conjunction with the azimuth measurements. For example, if 4 tilt positions measurements are desired, tilt positions T1 through T4 can be taken for each azimuth value before moving on to the next azimuth location. Alternatively, after all azimuth elevations for a particular elevation are taken at a first tilt value, the entire series of azimuth measurements can be performed at the second head tilt value. Head tilt is important because it interferes with the listener's perception of the spatial audio location, requiring adjustments to the HRTF pair for the listener to reflect that the head is no longer in a tilt neutral location. Head tilt refers to rotation about an axis running from nose to the back of the listener's head, somewhat similar to the concept of an aircraft's roll motion in rotation about an axis from the nose of the aircraft to the tail.

Following that, at step 610 interpolation is optionally undertaken in one embodiment to complete the grid at the selected elevation. To be clear, interpolation can be performed, according to various embodiments, at different stages. For example, interpolation can be performed after all azimuth and elevation values are captured for an entire distance sphere. Further still, interpolation can be performed when needed as determined by a direction provided in relation to the listener's use. Next, at step 612, rotation filters are generated, preferably by first truncating the measured BRIR's to a size more or less approximating that of an HRTF for recording of direct sound (anechoic). Without intending to limit the invention, truncating the HRTFs to less than 100 msec has been found to work suitably to adequately capture the direct sound. In one embodiment, interpolation occurs before truncation. In other embodiments, truncation is performed initially on the HRTFs with included room effects before interpolation. Once the interpolation is completed, in one embodiment, rotation filters are generated by dividing the truncated HRTFs in the dataset by a truncated version of the reference position HRTF (which includes the room reflection responses). If more elevation values remain as determined in step 614, a new elevation value is selected in step 615 and the steps 608, 610, and 612 continue. It should be appreciated that although measurement, interpolation, and generation of rotation filters are shown in sequential order for each elevation another embodiment involves taking the measurement phase to completion for all elevations, followed by interpolation for that entire spherical grid, and then generation of rotation filters. Once a determination has been made in block 614 that all elevation values have been processed the HRTF database for the selected distance sphere is completed (step 616) and preferably stored. If more distance spheres need to be captured or generated, a new distance is selected in step 619 and the process begins again a new set of azimuth, elevation, and tilt values for the new distance sphere. If a determination is made in step 618 that no more distance spheres remain to be captured or generated the process ends at step 620.

Use of the customized HRTF database (i.e., the generated HRTF grid 616) preferably commences with the processing of an input (step 634) of a spatial direction and audio to a DSP processor. Next, in step 636, the process for selecting an HRTF pair for the desired spatial direction that was input commences. In step 638, the decision tree determines whether the spatial direction is aligned with the sparse grid. If it does not line up precisely, a more accurate HRTF pair is generated by interpolation in step 640, preferably in the frequency domain. In step 642 the DSP applies the resulting HRTF pair (either from the sparse database or from interpolation) to the input audio signal. If no head rotation is detected in step 644, the process returns to step 646 for further input data. If head rotation is detected, in step 648 the DSP accesses the rotation filter database as previously generated and described. In step 650, the DSP applies the rotation filters selected, i.e., those corresponding to the detected azimuth and elevation parameters from the head tracking device. These are convolved with the originally selected or developed HRTF and the input audio signal. Once the HRTF is so modified, the process returns to step 646 for processing of further input data.

FIG. 7 is a diagram illustrating a system used in creating a customized HRTF dataset for a new listener in accordance with embodiments of the present invention. In further detail, FIG. 7 illustrates a system for generating HRTFs for customization use, acquiring listener properties for customization, selecting customized HRTFs for listeners, providing rotation filters adapted to work with relative user head movement and for rendering audio as modified by HRTFs in accordance with embodiments of the present invention. Extraction Device 702 is a device configured to identify and extract audio related physical properties of the listener. Although block 702 can be configured to directly measure those properties (for example the height of the ear) in preferred embodiments the pertinent measurements are extracted from images taken of the user, to include at least the user's ear or ears. The processing necessary to extract those properties preferably occurs in the Extraction Device 702 but could be located elsewhere as well. For a non-limiting example, the properties could be extracted by a processor in remote server 710 after receipt of the images from image sensor 704.

In a preferred embodiment, image sensor 704 acquires the image of the user's ear and processor 706 is configured to extract the pertinent properties for the user and sends them to remote server 710. For example, in one embodiment, an Active Shape Model can be used to identify landmarks in the ear pinnae image and to use those landmarks and their geometric relationships and linear distances to identify properties about the user that are relevant to selecting an HRTF from a collection of HRTF datasets, that is, from a candidate pool of HRTF datasets. In other embodiments an RGT model (Regression Tree Model) is used to extract properties. In still other embodiments, machine learning such as neural networks are used to extract properties. One example of a neural network is the Convolutional neural network. A full discussion of several methods for identifying unique physical properties of the new listener is described in WIPO Application: PCT/SG2016/050621, filed on Dec. 28, 2016 and titled "A Method for Generating a Customized Personalized Head Related Transfer Function", which disclosure is incorporated fully by reference herein.

The remote server 710 is preferably accessible over a network such as the internet. The remote server preferably includes a selection processor 710 to access memory 714 to determine the best matched HRTF dataset using the physical properties or other image-related properties extracted in Extraction Device 702. The selection processor 712 preferably accesses a memory 714 having a plurality of HRTF datasets. That is, each dataset will have an HRTF pair preferably for each point at the appropriate angles in azimuth and elevation. For example, taking measurements at every 3 degrees and elevations in half a sphere at similar 3-degree points, 120×60 points., or 7200 points would be required, each point representing 2 HRTFs (one for each ear), and each representing a short impulse response length for the direct (anechoic) case. As discussed earlier, these are preferably derived by measurement with in ear microphones on a population of moderate size (i.e., greater than 100 individuals) but can work with smaller groups of individuals and stored along with similar image-related properties associated with each HRTF data set. Rather than taking all 7200 points, these can be generated in part by direct measurement and in part by interpolation to form a spherical grid of HRTF pairs. Even with the partially measured/partially interpolated grid, further points not falling on a grid line can be interpolated once the appropriate azimuth and elevation values are used to identify an appropriate HRTF pair for a point from the HRTF dataset. For example, any suitable interpolation method may be used including but not limited to the interpolation methods described earlier such as adjacent linear interpolation, bilinear interpolation, and spherical triangular interpolation, preferably in the frequency domain.

Each of the HRTF Datasets stored in memory 714 in one embodiment includes at least an entire spherical grid for a listener. In such case, any angle in azimuth (on a horizontal plane around the listener, i.e. at ear level) or elevation can be selected for placement of the sound source. In other embodiments the HRTF Dataset is more limited, in one instance limited to the HRTF pairs necessary to generate speaker placements conforming to a conventional stereo setup (i.e., at +30 degrees and −30 degrees relative to the straight ahead zero position or, in another subset of a complete spherical grid, speaker placements for multichannel setups without limitation such as 5.1 systems or 7.1 systems.

FIG. 7 further depicts a sample logical relationship for the data stored in memory. The memory is shown including in column 716 HRTF Datasets for several individuals (e.g., HRTF DS1A, HRTF DS2A, etc.) These are indexed and accessed by properties associated with each HRTF Dataset, preferably image-related properties. The associated properties shown in column 715 enable matching the new listener properties with the properties associated with the HRTFs measured and stored in columns 716, 717, and 718. That is, they act as an index to the candidate pools of HRTF Datasets shown in those columns. Column 717 refers to a stored BRIR at reference position zero. This HRTF pair in column 717 (one for each ear) and with included room reverberations is associated with the remainder of the HRTF Dataset and preferably is combined with rotation filters as later described.

In some embodiments of the present invention 2 or more distance spheres are stored. This refers to a spherical grid generated for 2 different distances from the listener. In one embodiment, one reference position BRIR is stored and associated for 2 or more different spherical grid distance spheres. In other embodiments each spherical grid will have its own reference BRIR to use with the applicable rotation filters. Selection processor 712 is used to match the properties in the memory 714 with the extracted properties received from Extraction device 702 for the new listener. Various methods are used to match the associated properties so that correct HRTF Datasets can be selected. These include comparing biometric data by Multiple-match based processing strategy; Multiple recognizer processing strategy; Cluster based processing strategy and others as described in U.S. patent application Ser. No. 15/969,767, titled "SYSTEM AND A PROCESSING METHOD FOR CUSTOMIZING AUDIO EXPERIENCE", and filed on May 2, 2018, which disclosure is incorporated fully by reference herein. Column 718 refers to sets of HRTF Datasets for the measured individuals at a second distance. That is, this column posts HRTF datasets at a second distance recorded for the measured individuals. As a further example, the first HRTF datasets in column 716 may be taken at 1.0 m to 1.5 m whereas the HRTF datasets in column 718 may refer to those datasets measured at 5 m. from the listener. Ideally the HRTF Datasets form a full spherical grid but the present invention embodiments apply to any and all subsets of a full spherical grid including but not limited to a subset containing HRTF pairs of a conventional stereo set; a 5.1 multichannel setup; a 7.1 multichannel setup, and all other variations and subsets of a spherical grid, including HRTF pairs at every 3 degrees or less both in azimuth and elevation as well as those spherical grids where the density is irregular. For example, this might include a spherical grid where the density of the grid points is much greater in a forward position versus those in the rear of the listener. Moreover, the arrangement of content in the columns 716 and 718 apply not only to HRTF pairs stored as derived from measurement and interpolation but also to those that are further refined by creating HRTF datasets that reflect conversion of the former to an HRTF containing rotation filters. Further still the presence of the rotation filters in the HRTF datasets may involve first interpolation of a sparse measured HRTF dataset followed by conversion to rotation filters. Alternatively, it may involve conversion of a sparse dataset to rotation filters followed then by interpolation without departing from the scope of the present invention.

After selection of one or more matching HRTF Datasets, the datasets are transmitted to Audio Rendering Device 730 for storage of the entire HRTF Dataset deemed matching for the new listener, or, in some embodiments, a subset corresponding to selected spatialized audio locations. The Audio Rendering Device then selects in one embodiment the HRTF pairs for the azimuth or elevation locations desired and applies those to the input audio signal to provide to headphones 735 spatialized audio. In other embodiments the selected HRTF datasets are stored in a separate module coupled to the audio rendering device 730 and/or headphones 735. In other embodiments, where only limited storage is available in the rendering device, the rendering device stores only the identification of the associated property data that best matches the listener or the identification of the best match HRTF Dataset and downloads the desired HRTF pair (for a selected azimuth and elevation) in real time from the remote sever 710 as needed. As discussed earlier, these HRTF pairs are preferably derived by measurement with in ear microphones on a population of moderate size (i.e., greater than 100 individuals) and stored along with similar image-related properties associated with each HRTF data set. Rather than taking all 7200 points, these can be generated in part by direct measurement and in part by interpolation to form a spherical grid of HRTF pairs. Even with the partially measured/partially interpolated grid, further points not falling on a grid line can be interpolated once the appropriate azimuth and elevation values are used to identify an appropriate HRTF pair for a point from the HRTF dataset.

FIG. 8 is a flowchart illustrating methods of generating HRTF Datasets by acquisition and measurement in accordance with embodiments of the present invention. Block 720 refers to the HRTF generation block as shown in FIG. 7. One method for acquiring an HRTF Dataset is known conventionally by reference to the data accumulated by various researchers such as the Kemar studies on a mannequin mentioned earlier or other generic HRTF Datasets. This step is encompassed by block 804 in the flowchart. These have the advantage of not being intrusive upon the time constraints of a human listener for measurement. One disadvantage is that at best they represent an average reading which are not particularly well suited for accurate sound location perception by most individuals. In step 804, HRTF measurements may alternatively be acquired by measurement of another head, representing an "average" individual. While working well for generation of perceptual audio for the individual measured, the results are often less than hoped for when applied to a broad population of individuals.

Step 811 shows a method of generating a customized HRTF Dataset for an individual in accordance with one embodiment of the present invention. In these steps a single user is subjected to the full scope of measurements or at least a sparse set involving the desired azimuth and elevation points desired. The room selected will have a dramatic effect on how the HRTF pairs color the sound. Next, in step 812, if a sparse set is measured, interpolation is performed to complete the HRTF dataset. Next, in step 813, rotation filters are generated by taking the room HRTF at each location in the Dataset and dividing it by the HRTF at the reference position, typically at position 0 in azimuth and elevation. In one embodiment this is a truncated version of the BRIR for a reference position. If a second or more of a distance spherical grid is desired, the above steps are performed at the second distance sphere. This completes the generation of the HRTF Datasets for that individual for that distance sphere (or spheres). This HRTF dataset will, through the use of the shorter rotation filters, allow storage of smaller filters but still enabling the sound quality of the originally measured room HRTFs.

Steps 821 through 825 show an alternative embodiment which generates an HRTF Dataset for a new listener without requiring the insertion of microphones into the new listener's ears. According to these steps a plurality of HRTF datasets will be made available for selection by or for a new listener. In step 821 multiple measurements are made for a number of different individual in a selected room. Although this can be an anechoic room, i.e., one with suppression of reflections by the use of sound insulating materials, in embodiments of the present invention these measurements can be made in any type of room. They can be performed in rooms that are treated or non-treated, all depending on the user preference.

One optimized testing/measurement arrangement involves taking the measurements at every 30 or 45 degrees and deriving the other impulses response values by interpolation to complete the spherical grid of HRTF pair values. See step 822. Any interpolation method will work suitably but applicant believes that the specific interpolation techniques described elsewhere in this specification provide unique advantages. For example, frequency domain interpolation has been tested in these configurations to provide greater accuracy, thereby allowing sparse grids to satisfactorily rely on measured values at a coarseness range of even 15 to 30 degrees.

In step 823, rotation filters are generated for each point of the desired spherical grid from the combination of measured and interpolated values. Note that the conversion to rotation filters may precede in whole or in part the interpolation step 822. For either the interpolation steps or rotation filter generation steps the earlier determined HRTF values are truncated to simplify the operations. This should not result in the loss of any resolution or other metric of accuracy since the initial HRTFs will include a room response that makes it longer than desired for these algebraic operations. It should be noted that after generation of the rotation filters, except for HRTF/rotation filter pairs for the desired reference points, the longer measured HRTF/BRIR values may be optionally discarded. In accordance with the invention relevant properties of the measured others are identified. For ease of matching, in preferred embodiments these are image-related properties as described earlier in this specification including with respect to FIG. 7.

Finally, after the foregoing steps have been completed for the spherical grid for the initial distance, typically 1.0 to 1.5 m, those same steps are preferable completed for a second distance or even further still a 3rd distance as symbolized by block 825. Step 808 denotes the conclusion of these steps in generating s the HRTF datasets for further use in rendering audio.

FIG. 9A is a diagram illustrating generation of a sparse spherical grid around the listener in accordance with one embodiment of the present invention. The distance sphere 901 is shown in perspective as an invisible sphere. In the course of generating a complete HRTF dataset for an individual several optimizations can take place to reduce measurement time. One is the creation of a sparse grid, as described earlier. While ideally measurements at every 3 or 5 degrees would be desired, coarse measuring techniques such as taking initial measurements at every 30, 45, or even 90 degrees can provide a workable base for later interpolation. For example, listener 902 located at position 903 in horizontal plane 908 around the listener's head position (at ear level) would have measurements taken at every 90 degrees in various elevation planes, including 0 degree elevation (horizontal plane 908); at 30 degrees elevation (plane 909) and at 45 degrees elevation (plane 910). In the plane reflecting measurements at 45 degrees of elevation, measurement points 912, 913, 914, and 915 would be taken. Vector 907 shows the reference direction of 0 degrees in azimuth for the plane at 45 degrees elevation. Vectors 905 and 906 respectively show the zero degree azimuth locations in horizontal plane at 0 degrees and at 30 degrees of elevation.

FIG. 9B is a diagram illustrating the results of interpolation as applied to the spherical grid of FIG. 9A around the listener in accordance with one embodiment of the present invention. Interpolated points 918 are added to each of the planes to increase the resolution, shown in FIG. 9B to be increased to every 45 degrees. These points can be determined by any interpolation technique including especially the particular interpolation techniques described earlier in this specification. Ideally, and in accordance with embodiments of the invention, the resolution is increased to as close as approximately 3 degrees. As described earlier, and in accordance with embodiments of the present invention, rotation filters are generated from the completed spherical grid.

FIG. 9C is a diagram illustrating resultant vectors generated by head movement and selection of associated rotation filters in accordance with embodiments of the present invention. As with FIGS. 9A and 9B sphere 901 is invisible and shows in perspective the spherical grid and its points. For example, the reference position for the rotation filters is taken at point 922 in the horizontal plane 908 relative to the listener's head 904. For further clarity point 923 shows a position at −90 degrees relative to the point 922 positioned at 0 degrees, and point 924 shows a position at 180 degrees. Vector 930 represents a resultant movement detected with respect to the listener from the initial reference position 922 to point 928 on the spherical grid, the movement summarized as the combination of a horizontal rotation of the head of 10 degrees to the right (clockwise) and 45 degrees up (in elevation). Any of various sensor techniques will work with the present embodiments including but not limited to gyroscopes, accelerometers, and magnetic sensors. Once the resultant head rotation is detected (that is, in both the horizontal plane and in elevation, the corresponding HRTF values (rotation filters) can be determined from the HRTF Dataset derived for the individual and applied to the input audio stream in the rendering device 730, preferably after first combining them with the reference position set of BRIRs (here that determined for the point at 0 degree elevation and 0 degree azimuth location (point 922). One preferred embodiment bases the selection of new HRTF (rotation filters) on head movement. The same techniques are applicable to identifying a new location for an audio stream without the involvement of head sensors or other monitors of head movement.

FIG. 10 is a diagram illustrating spherical databases at different distances in accordance with embodiments of the present invention. In further detail, 1002 depicts a top view of a collection of distance spherical grids, in this case respectively at 1.5 m and 5 m, though the drawing is not to scale. The reference positions for each of these 2 spherical grids lie respectively at points 956 and 966, i.e, the zero degree reference positions. Though only 2 spherical grids are shown it should be noted that the scope of the invention encompasses a plurality of spherical grids, for example, 2, 3, or 4 or more. For the closer spherical grid 901 at 1.5 m, 4 measured locations are depicted, i.e., positions 950, 952, 954, and 956. Following completion of the measurements additional points are determined for this spherical grid by interpolation, for example interpolated points 951. A second spherical grid 1001 at 5.0 m shows from an initial determination measured points 960, 962, 964, and 966 in one quadrant of the horizontal axis surrounding listener 902. Interpolation follows on the 5.0 m spherical grid to determine interpolated points 961. Further still, if intermediate distances are desired, such as points 955, these can be interpolated from corresponding determined points on spherical grids 901 and 1001.

FIG. 11 is a diagram illustrating examples of direct and reflected sounds replicated by embodiments of the present invention. In the course of creating HRTF datasets, measurements are taken at various speaker locations relative to the head and torso of an individual, such as listener 1004 in FIG. 10. The drawing shows the listener 1004 positioned in a room 1002 with the source speaker 1006 at approximately 45 degrees left of center (0 degrees). For measurements, whether the listener 1004 is an individual or a simulated individual such as a mannequin, microphones can be inserted in the ears (real or synthetic) and measurements made of the received sound signals. Typical HRTF datasets are made by positioning the relative sound source location at various azimuth values and in some cases elevation values to create a somewhat of a 3-dimensional grid around the head of the listener. In various embodiments of the present invention, both direct and indirect sound waves (reflections) are captured and replicated in the HRTFs to aid in providing realistic audio rendering. Throughout the specification reference has been made to BRIRs, which are head related transfer functions that include room effects as opposed to anechoic transfer functions that are limited to directly received sound. FIG. 11 shows direct sound wave 1008 received at the listener 1004 along with example reflected audio waves 1009 and 1011. Conventional practice provides HRTF's which are anechoic. That is, they only reflect receipt of direct sound waves at the listener's ears (such as wave 1008) and do not record the reflected sounds or reverberations caused by sound bouncing off of the room walls and other objects in the room. Using such an HRTF for rendering will not replicate the realism of the listener sitting in a defined environment, such as a room. Conventional HRTFs usually reflect an impulse response of dozens of milliseconds in duration.

While this may be sufficient to record the refractions of sound around the listener's head and reflections off of the listener's shoulders and torso, it is not long enough to capture the room effects, such as including reflections off of walls like wall 1014. This can be appreciated by viewing the relative lengths of the sound paths shown in FIG. 11. For illustration purposes, if sound source such as speaker 1006 is 2 m from the listener 1004 in a room 1002 sized at 5 m×5 m, then even the path of reflected wave 1009 would be at least 4 times the direct wave 1008 length. Preferably the BRIR used is hundreds of milliseconds long to capture later reflections and for larger rooms or environments.

One should appreciate that for larger rooms or for sound sources at a greater distance from the listener's head, even longer BRIRs result.

It should be appreciated that throughout the specification and including illustrations in the drawings section discussion has included the generation of HRTF maps, datasets, or grids. Any description herein generally applicable to HRTFs and the generation of HRTF datasets should be interpreted as also a discussion of using those techniques in the more general case of BATFs (including BRIRs) and this specification should be read also as describing those techniques as applied to BATFs and also to BRIRs as a subset of BATFs.

In yet other embodiments, the response characterizing how the ear receives sound includes a distance component. Distance aspects are important in replicating accurately the sounds perceived by the user through a binaural system such as through headphones. These are especially important for music sources, such as in attempting to duplicate a listener's experience in a music hall (e.g., an orchestral event at the Hollywood Bowl); a listener's dedicated media room, or even his living room populated with high fidelity speakers. As with the HRTFs discussed earlier for azimuth and elevation positions, considering a distance component and providing that accommodation in the HRTFs used in applied to the audio track provides an even better experience when the distance component is customized for the user.

In a preferred embodiment, physical properties are derived from the users' ear by means of a camera image. This may be a standalone camera or any integrated camera but more preferably is a smartphone camera. The acquired image is processed to extract features of the user's ear. These are forwarded to a selection processor, for example to one located in a remote host computer.

To achieve better perceived audio, a BRIR representing the acoustic environment is measured for the individual. This can be and is preferably done with a single BRIR, say one taken at 0 degrees. Due to the length of the response only a single value is stored. That is, a room response to measure reflections would typically have to be hundreds of milliseconds or so in length to accurately replicate the room effect. In one embodiment the BRIR is 500 msec. long.

Preferably, the BRIR single point measurement is also taken at 5.0 m and also at 10 m. If we wish to add the distance component at say 3.0 m, the 0 degree BRIR for the 1.0 m table and the like one at the 5.0 m table is accessed and interpolated to generate the 3.0 m HRTF at that azimuth and elevation. To be clear, once a room response is determined for a single position at 3.0 m (whether by measurement or interpolation) the room impulse response (BRIR) can be used to accurately portray the virtual audio at any azimuth and elevation by using the BRIR (at position 0) and convolving that with the appropriate rotation filter. That is, the reference position BRIR is convolved with a transfer function corresponding to the conversion of the BRIR for a first position to a BRIR for a second and different position to quickly and accurately accommodate sensed head rotation.

In general, the process has the following elements, which may all be carried out on the same processor, or some of which may be carried out on a microcontroller, and some on a digital signal processor:

a) Interfacing with the head tracking sensor and deriving head orientation information,
b) Converting the head orientation into a head-relative azimuth and elevation for each virtual speaker,
c) Converting each head-relative azimuth and elevation into a pair of rotation filters,
d) Transmitting the rotation filters to the DSP
e) Processing the audio using BRIR and rotation filters.

Ideally, the rotation filters would be matched to the BRIRs, which would be personalized to the user. So the same personalization process, as applied to the BRIRs, could be applied to the rotation filters. However, as alluded to above, good results can still be obtained by using an unrelated database to derive the filters and thereby saving considerable time in capturing the BRIRs.

The proposed spatial audio system with head tracking is expected to provide several advantages. It can be used in Virtual Reality applications or generally any application that renders 3D spatial audio. In comparison with the prior art, the novelties and advantages of this proposed scheme can be summarized as follows:

The greatest economies from the embodiments of the present invention are achieved from the reduction in complexity of the filters. That is, the filter size is reduced substantially. For example, the size of each rotation filter is in hundreds of samples (typically <<1000 samples). In contrast, an HRTF (which includes room response) may be in the order of thousands (a 500 msec HRTF will require 500/1000*48000=24,000 samples, where sampling rate=48 kHz).

The corresponding reduction in required processing makes high-quality head-tracking realizable on portable devices rather than just desktop computers. In accordance with embodiments of the present invention, a method for providing a Head Related Transfer Function (HRTF) for application to an input audio signal for localizing audio to a set of headphones is provided. The method involves accessing a plurality of binaural room impulse responses (BRIRs) individualized for a listener at a reference position; accessing a plurality of head related transfer function (HRTFs) pairs for the listener corresponding to additional positions relative to the listener; deriving a plurality of transfer functions for converting HRTFs or BRIRs for the reference position relative to the listener to each of the additional positions by dividing each of the plurality of HRTFs for the additional positions by one of an HRTF or BRIR for the reference position; receiving a signal indicating a change in head orientation and selecting one pair of the plurality of transfer functions in response to and corresponding to the signal; and applying the reference position BRIR and the selected pair of the plurality of transfer functions to the input audio signal to localize the audio in the set of headphones.

In accordance with another embodiment, a headphone for spatial audio rendering is provided and includes a first database having a first Binaural Acoustic Impulse Response (BAIR) pair corresponding to a reference audio source location; a head sensor identifying head orientation information; a second database of rotation filters stored in memory configured for use in modifying the first BAIR pair to correspond to a second group of speaker locations having at least one of defined azimuth, elevation, and tilt values different than the first locations and derived from the head orientation information; and a processor configured to combine the rotation filters with the first BAIR pair to generate an output binaural audio signal to transducers of the headphone, wherein the rotation filters comprise transfer functions for converting BAIRs for a first position to a second and different position and wherein the BAIRs for the second position correspond to BAIR pairs generated for a listener and said transfer functions are derived by dividing the respective BAIR pairs for the second position by the BAIR pairs for the reference position.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein but may be modified within the scope and equivalents of the appended claims.

What is claimed is:

1. A system for generating binaural signals for rendering audio over headphones comprising;
a first database having at least one binaural room impulse response pair, wherein the binaural room impulse response pair corresponds to a reference position;
a second database having a plurality of rotation filters; and
a sensing mechanism to determine a deviation of the head orientation from the reference position, wherein the deviation is used to select a rotation filter for processing with an audio signal for rendering the audio signal over the headphones.

2. The system as recited in claim 1 wherein the processing further includes combining the audio signal with the selected rotation filter and a selected one of the at least one binaural room impulse response pair.

3. The system as recited in claim 1 wherein at least part of the second database of rotation filters is derived by interpolation.

4. The system as recited in claim 3 wherein the second database of rotation filters is expanded from a sparse set by interpolation of the derived rotation filters.

5. The system as recited in claim 3 wherein the second database of rotation filters is derived from an HRTF dataset with a portion of the HRTF dataset expanded from an acquired sparse HRTF dataset by interpolation of the acquired HRTF pairs.

6. The system as recited in claim 3 wherein the rotation filter database includes a nonuniform distribution of deviations.

7. The system as recited in claim 1 wherein the rotation filters are derived from an HRTF dataset individualized for the user.

8. An audio device for rendering binaural audio over headphones to a listener comprising:
   a first memory portion having a binaural room impulse response pair corresponding to a reference position of the listener's head, the binaural audio impulse response pair personalized for the listener;
   a second memory portion having a plurality of rotation filters; and
   a processor responsive to a head tracking signal for the listener's head and further configured for determining a rotation filter from the second memory portion corresponding to the head tracking signal and combining it with the binaural room impulse response pair and an input audio signal for generation of the binaural audio and transmitting the result to the headphone.

9. The audio device as recited in claim 8 wherein the rotation filters are shorter in length than the binaural room impulse response pair and wherein the rotation filters are determined by interpolating in the frequency domain from stored values in the second memory portion.

10. A method of binaural reproduction of audio in a headphone comprising:
    selecting from a first database in memory a reference binaural room impulse response for association with a reference position;
    determining from a second database in memory having a plurality of rotation filters a rotation filter corresponding to a detected amount of head movement relative to an initial head position corresponding to the reference position; and
    processing an audio signal with the reference binaural room impulse response and the selected rotation filter to generate a binaural output signal for the headphone.

11. The method as recited in claim 10 wherein the processing comprises convolution.

12. The method as recited in claim 10 wherein the plurality of rotation filters are derived from an HRTF dataset or BRIR dataset personalized for the listener.

13. The method as recited in claim 12 wherein the HRTF dataset or BRIR dataset are initially populated as a sparse dataset and the granularity is increased afterwards by interpolating additional points.

14. The method as recited in claim 10 wherein the plurality of rotation filters are derived from a generic captured HRTF set.

15. The method as recited in claim 10 wherein the plurality of rotation filters are derived from a non-personalized HRTF set.

16. The method as recited in claim 10 wherein the plurality of rotation filters correspond to at least one of different azimuth, elevation positions, tilt, and inclination positions of the head relative to the head position for the reference position.

17. The method as recited in claim 10 wherein each of the plurality of rotation filters are shorter in length than the reference binaural room impulse response.

18. The method recited in claim 10 wherein when head movement is detected the processing includes a cross-fade to transition to the new rotation filter corresponding to the detected head movement.

19. The method recited in claim 17 wherein the determination of the rotation filter corresponding to the detected head movement results from a real-time interpolation applied to the second database and wherein the interpolation is performed in the frequency domain.

20. The method recited in claim 19 wherein the first database contains a plurality of binaural room impulse responses which are customized for a listener based on use of a candidate pool of datasets of impulse responses and by using identified audio related physical properties of the listener.

\* \* \* \* \*